(12) United States Patent
Amano et al.

(10) Patent No.: US 8,318,859 B2
(45) Date of Patent: *Nov. 27, 2012

(54) PRESSURE-SENSITIVE ADHESIVE COMPOSITIONS, PRESSURE-SENSITIVE ADHESIVE SHEETS AND SURFACE PROTECTING FILMS

(75) Inventors: Tatsumi Amano, Ibaraki (JP); Natsuki Ukei, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 597 days.

This patent is subject to a terminal disclaimer.

(21) Appl. No.: 11/375,963

(22) Filed: Mar. 15, 2006

(65) Prior Publication Data

US 2006/0207722 A1 Sep. 21, 2006

(30) Foreign Application Priority Data

Mar. 16, 2005 (JP) .................................. 2005-074963
Jan. 30, 2006 (JP) .................................. 2006-021035

(51) Int. Cl.
*C08K 5/34* (2006.01)
*C08K 5/3412* (2006.01)
*C08K 5/3415* (2006.01)
*C08K 5/3432* (2006.01)
*C08K 5/3445* (2006.01)
*C08K 5/50* (2006.01)
*C08L 33/08* (2006.01)
*B32B 7/12* (2006.01)
*B32B 27/30* (2006.01)

(52) U.S. Cl. .............. 525/123; 524/86; 524/94; 524/98; 524/99; 524/100; 524/104; 524/106; 524/154; 524/236; 524/251; 524/560; 156/327; 428/343; 428/522; 528/271; 528/492

(58) Field of Classification Search ................. 156/327; 428/343, 522; 524/103, 95, 99, 106, 86, 524/94, 98, 100, 104, 154, 236, 251, 560; 528/392, 492, 271; 525/123, 30
See application file for complete search history.

(56) References Cited

U.S. PATENT DOCUMENTS

| | | | |
|---|---|---|---|
| 3,492,276 A | 1/1970 | Smith | |
| 4,145,327 A | 3/1979 | Dolch et al. | |
| 4,313,978 A | 2/1982 | Stevens et al. | |
| 5,183,841 A | 2/1993 | Bernard | |
| 5,296,627 A * | 3/1994 | Tang et al. | 558/34 |
| 5,433,892 A | 7/1995 | Czech | |
| 5,631,079 A | 5/1997 | Gutman et al. | |
| 5,885,678 A | 3/1999 | Malhotra | |
| 5,952,398 A | 9/1999 | Dietz et al. | |
| 6,028,132 A | 2/2000 | Hayashi | |
| 6,103,316 A * | 8/2000 | Tran et al. | 427/505 |
| 6,245,847 B1 | 6/2001 | Green et al. | |
| 6,372,829 B1 | 4/2002 | Lamanna et al. | |
| 6,407,788 B1 | 6/2002 | Okumura et al. | |
| 6,518,342 B1 | 2/2003 | Tanaka et al. | |
| 6,562,428 B1 | 5/2003 | Ohrui | |
| 6,596,375 B2 | 7/2003 | Murata et al. | |
| 6,657,011 B2 | 12/2003 | Lau et al. | |
| 6,706,920 B2 | 3/2004 | Lamanna et al. | |
| 6,939,911 B2 | 9/2005 | Tosaki et al. | |
| 7,491,758 B2 | 2/2009 | Amano et al. | |
| 7,842,742 B2 * | 11/2010 | Amano et al. | 524/86 |
| 2001/0031835 A1 | 10/2001 | Ohrui et al. | |
| 2001/0041763 A1 | 11/2001 | Suzuki et al. | |
| 2002/0132111 A1 | 9/2002 | Zhou et al. | |
| 2002/0137825 A1 | 9/2002 | Lamanna et al. | |
| 2003/0017330 A1 | 1/2003 | Okochi et al. | |
| 2003/0114560 A1 | 6/2003 | Yang et al. | |
| 2003/0122997 A1 | 7/2003 | Noh et al. | |
| 2004/0054041 A1* | 3/2004 | Schmidt | 524/99 |
| 2005/0025903 A1 | 2/2005 | Fink et al. | |
| 2005/0080195 A1 | 4/2005 | Iwama | |
| 2005/0197450 A1 | 9/2005 | Amano et al. | |
| 2005/0266238 A1 | 12/2005 | Amano et al. | |
| 2006/0024494 A1 | 2/2006 | Amano et al. | |
| 2006/0100323 A1 | 5/2006 | Schmidt et al. | |
| 2006/0156481 A1 | 7/2006 | Lim | |
| 2006/0188711 A1 | 8/2006 | Kishioka et al. | |
| 2006/0217515 A1 | 9/2006 | Getman et al. | |
| 2006/0223962 A1 | 10/2006 | Getman et al. | |
| 2007/0141329 A1 | 6/2007 | Yang et al. | |
| 2007/0149650 A1 | 6/2007 | Masuda | |
| 2008/0176976 A1 | 7/2008 | Amano et al. | |

Schematic view of an electrostatic measuring part

| | | | |
|---|---|---|---|
| 2009/0029162 | A1 | 1/2009 | Ukei et al. |
| 2009/0163626 | A1 | 6/2009 | Ukei et al. |
| 2009/0317635 | A1 | 12/2009 | Amano et al. |

FOREIGN PATENT DOCUMENTS

| | | |
|---|---|---|
| CN | 1561364 | 1/2005 |
| EP | 0 435 080 A1 | 7/1991 |
| EP | 0 684 295 | 11/1995 |
| EP | 0 873 986 A1 | 10/1998 |
| EP | 0 919 603 | 6/1999 |
| EP | 1 102 108 A2 | 5/2001 |
| EP | 1 491 604 | 12/2004 |
| EP | 1 548 750 A1 | 6/2005 |
| EP | 1 574 557 | 9/2005 |
| EP | 1 582 573 A2 | 10/2005 |
| EP | 1 591 506 A1 | 11/2005 |
| EP | 1 595 929 A1 | 11/2005 |
| EP | 1 602 698 A1 | 12/2005 |
| EP | 1 621 596 A2 | 2/2006 |
| EP | 1 621 596 A3 | 2/2006 |
| EP | 1693430 A2 | 8/2006 |
| GB | 2121061 | 12/1983 |
| JP | 55-086860 | 7/1980 |
| JP | 59-226076 | 12/1984 |
| JP | 61-138901 | 6/1986 |
| JP | 4-309585 | 11/1992 |
| JP | 5-009449 | 1/1993 |
| JP | 6-051121 | 2/1994 |
| JP | 6-128539 | 5/1994 |
| JP | 9-157618 | 6/1997 |
| JP | 9-165460 A | 6/1997 |
| JP | 9-208910 A | 8/1997 |
| JP | 10-231325 | 9/1998 |
| JP | 10-298539 | 11/1998 |
| JP | 11-256116 | 9/1999 |
| JP | 11-349910 | 12/1999 |
| JP | 2000-129235 | 5/2000 |
| JP | 2000-191991 | 7/2000 |
| JP | 2000-273417 | 10/2000 |
| JP | 2001-209039 | 8/2001 |
| JP | 2001-318230 | 11/2001 |
| JP | 2002-022960 | 1/2002 |
| JP | 2002-356662 | 12/2002 |
| JP | 2002-544364 A | 12/2002 |
| JP | 2003-511505 | 3/2003 |
| JP | 2003-195044 | 7/2003 |
| JP | 2003-202722 | 7/2003 |
| JP | 2003-268334 | 9/2003 |
| JP | 2003-294951 | 10/2003 |
| JP | 2003-320631 | 11/2003 |
| JP | 2003-342483 | 12/2003 |
| JP | 2004-135167 | 4/2004 |
| JP | 2004-517185 | 6/2004 |
| JP | 2004-217931 | 8/2004 |
| JP | 2004-237515 | 8/2004 |
| JP | 2004-287199 | 10/2004 |
| JP | 2004-536940 | 12/2004 |
| JP | 2005-15524 | 1/2005 |
| JP | 2005-105228 | 4/2005 |
| JP | 2005-113128 | 4/2005 |
| JP | 2005-206776 | 8/2005 |
| JP | 2008-534714 | 8/2008 |
| TW | 200516124 | 5/2005 |
| WO | WO 97/08260 | 3/1997 |
| WO | WO 98/36005 | 8/1998 |
| WO | WO 00/24839 * | 5/2000 |
| WO | WO 00/69985 | 11/2000 |
| WO | WO 01/25326 | 4/2001 |
| WO | WO 02/13980 A1 | 2/2002 |
| WO | WO 02/053636 A1 | 7/2002 |
| WO | WO 03/011958 A1 | 2/2003 |
| WO | WO 03/068280 | 8/2003 |
| WO | WO 03/085050 A2 | 10/2003 |
| WO | WO 03/099953 A1 | 12/2003 |
| WO | WO 2004/005391 A1 | 1/2004 |
| WO | WO 2004/027788 A1 | 4/2004 |
| WO | WO 2004/65523 A1 | 8/2004 |
| WO | WO 2005/061627 | 7/2005 |

OTHER PUBLICATIONS

European Search Report issued on the corresponding European Patent Application No. EP 06 11 1107, dated Jun. 27, 2006.
Peter Wasserscheid, et al., Ionic Liquids-New "Solutions" for Transition Metal Catalysis, Angew. Chem. Int. Ed. 2000, 39, 3772-3789.
Brochure regarding "Functional Chemicals" published by Kyoeisha Chemical Co., LTD., printed and published in May 2003, front page, pp. 11-12, 19-20 and back page.
European Office Action issued on the related European Patent Application No. EP05016102.5, dated Apr. 16, 2007.
European Search Report issued on the related European Patent Application No. EP05011720.9, dated Sep. 30, 2005.
European Search Report issued on the related European Patent Application No. EP05016102.5, dated Dec. 29, 2005.
European Search Report issued on the related European Patent Application No. EP06110235.6, dated May 25, 2007.
European Search Report issued on the related European Patent Application No. EP05004925, dated Oct. 24, 2005.
Information Supplement filed on the related Japanese Patent Application No. 2005-26704, dated May 14, 2007.
International Search Report issued on the related PCT Application No. PCT/JP2006/309712, dated Jun. 20, 2006.
International Search Report issued on the related PCT Application No. PCT/JP2006/317522, dated Dec. 12, 2006.
Partial European Search Report issued on the related European Patent Application No. EP05016102, dated Nov. 8, 2005.
File History of the related U.S. Appl. No. 11/073,456, for the period of Nov. 4, 2008-May 4, 2009.
File History of the related U.S. Appl. No. 11/141,590, for the period of Nov. 4, 2008-May 4, 2009.
File History of the related U.S. Appl. No. 11/188,561, for the period of Nov. 4, 2008-May 4, 2009.
File History of the related U.S. Appl. No. 11/914,939, for the period of Nov. 4, 2008-May 4, 2009.
File History of the related U.S. Appl. No. 12/065,652, for the period of Nov. 4, 2008-May 4, 2009.
Korean Office Action issued on corresponding Korean Patent Application No. 10-2006-0023951, dated Aug. 11, 2009.
File History of the related U.S. Appl. No. 11/073,456, for the period of May 5, 2009-Oct. 13, 2009.
File History of the related U.S. Appl. No. 11/141,590, for the period of May 5, 2009-Oct. 13, 2009.
File History of the related U.S. Appl. No. 11/188,561, for the period of May 5, 2009-Oct. 13, 2009.
File History of the related U.S. Appl. No. 12/065,652, for the period of May 5, 2009-Oct. 13, 2009.
File History of the related U.S. Appl. No. 12/052,951, for the period of Nov. 4, 2008-Oct. 13, 2009.
File History of the related U.S. Appl. No. 12/548,318, as of Oct. 13, 2009.
Hans-Georg Elias: "Makromoleküle Band 1 Grundlagen Struktur-Synthese-Eigenschaften", Hüthig & Wepf Verlag, Basel Heidelberg New York, pp. 845-857 (1990).
M.D. Lechner, K. Gehrke, E.H. Nordmeier: "Makromolekulare Chemie-Ein Lehrbuch für Chemiker, Physiker, Materialwissenschaftler und Verfahrenstechniker" Birkhäuser Verlag, Basel Boston Berlin, pp. 295-299 (1996).
File History of the related U.S. Appl. No. 11/073,456, for the period of Oct. 14, 2009-Apr. 12, 2010.
File History of the related U.S. Appl. No. 11/188,561, for the period of Oct. 14, 2009-Apr. 12, 2010.
File History of the related U.S. Appl. No. 12/065,652, for the period of Oct. 14, 2009-Apr. 12, 2010.
File History of the related U.S. Appl. No. 12/052,951, for the period of Oct. 14, 2009-Apr. 12, 2010.
File History of the related U.S. Appl. No. 12/548,318, for the period of Oct. 14, 2009-Apr. 12, 2010.
Examination Report dated Jan. 3, 2012 in corresponding Taiwanese Patent Application No. 095107388.
"Polyacrylate" In: Jürgen Falbe, Manfred Regitz: "Römpp Chemie Lexlkon", 1992, Georg Thieme Verlag, Stuttgart New York, pp. 3506-3507.

Rudolf Riesen et al.: "Dle Glasübergangtemperatur gemessen mit verschiedenen TA-Techniken, Teil 2: Ermittlung der Glasübergangstemperaturen", Usercom Informationen Fur Anwender Von Mettler Toledo Thermoanalysen-Systemen, [Online] No. 18, Feb. 2003, pp. 1-20, XP002594785, Retrieved from the Internet: URL: http://de.mt.com/global/de/home/supportive_content/usercom/TA_UserCom18.z2vUzxjpy0vKAxrVCMLHBfbHC145nAzOnG-.MediaFileComponent.Ftml/tausercl8d.pdf> [retrieved on Feb. 1, 2003].

"Katalog Handbuch Felnchemikallen, product No. 18,206-0", Jan. 1, 1999, Katalog Handbuch Feinchemikalien, Aldrich, p. 1588.

Erich Penzel et al., Some properties of copolymers of vinylidene chloride with acrylates and methacrylates, Part 1, Die Angewandte Makromolekulare Chemie 273 (1999) 15-27 (Nr. 4703).

Notification of Reasons for Refusal issued in corresponding Japanese patent application No. 2005-110917, dated Mar. 13, 2012.

Notification of Reasons for Refusal issued in corresponding Japanese patent application No. 2009-025085, dated Mar. 13, 2012.

Notification of Reasons for Refusal issued in corresponding Japanese patent application No. 2005-026737, dated Mar. 13, 2012.

Notice of Final Rejection issued in corresponding Korean Patent Application No. 10-2005-0019335, dated Jan. 31, 2011.

Trial Board Decision issued in corresponding Korean Patent Application No. 10-2005-0019335, dated Aug. 23, 2011.

Office Action issued in corresponding Korean Patent Application No. 10-2010-0095333, dated Dec. 17, 2010.

Office Action issued in corresponding Korean Patent Application No. 10-2010-0095353, dated Dec. 17, 2010.

Office Action issued in corresponding Korean Patent Application No. 10-2011-0021739, dated Jun. 10, 2011.

Notice of Final Rejection issued in corresponding Korean Patent Application No. 10-2011-0021739, dated Jan. 19, 2012.

Office Action issued in corresponding Taiwan Patent Application No. 094106805, dated Aug. 4, 2011.

Notice of Final Rejection issued in corresponding Chinese Patent Application No. 200510054498.0, dated Apr. 6, 2011.

Office Action issued in corresponding European Patent Application No. 07116761.3, dated May 5, 2011.

"Zimmertemperatur" In: Jurgen Falbe, Manfred Regitz: "Rompp Chemie Lexikon", 1992, Georg Thieme Berlag, Stuttgart New York, p. 5132.

Office Action issued in corresponding Japanese Patent Application No. 2005-010022, dated Dec. 3, 2010.

Chemistry Handbook Basic Edition I, Maruzen Kabushikikaisha, 1985, pp. 456-457, 460-461, Partial Translation.

Notice of Final Rejection in corresponding Japanese Patent Application No. 2005-026737, dated Nov. 15, 2010.

Office Action issued in corresponding Japanese Patent Application No. 2005-026357, dated Jul. 28, 2011.

Office Action issued in corresponding Japanese Patent Application No. 2006-224368, dated Apr. 28, 2011.

Offer of Information issued in corresponding Japanese Patent Application No. 2006-224368, dated Jul. 15, 2011.

Office Action issued in corresponding European Patent Application No. 06797428.7, dated Jul. 20, 2011.

Office Action issued in corresponding Japanese Patent Application No. 2006-239085, dated Aug. 30, 2011.

Summons to attend oral proceedings issued in corresponding European Patent Application No. 09165905.2, dated May 19, 2011.

Office Action issued in corresponding European Patent Application No. 09165906.0, dated May 10, 2011.

Office Action issued in corresponding European Patent Application No. 10165984.5, dated May 19, 2011.

Extended Search Report issued in corresponding European Patent Application No. 10183682.3, dated Sep. 5, 2011.

Notice of Final Rejection issued in corresponding Korean Patent Application No. 10-2009-0091590, dated Jun. 30, 2011.

Notice of Final Rejection issued in corresponding Korean Patent Application No. 10-2009-0091627, dated Jun. 30, 2011.

Trial Board Decision issued in corresponding Korean Patent Application No. 10-2009-0091627, dated May 23, 2012.

Office Action issued in corresponding Taiwanese Patent Application No. 094124749, dated Dec. 20, 2011.

Office Action issued in corresponding Chinese Patent Application No. 200510084543.7, dated Mar. 8, 2011.

Office Action issued in corresponding Chinese Patent Application No. 200510084543.7, dated Jun. 22, 2011.

Notice of Final Rejection issued in corresponding Chinese Patent Application No. 200510084543.7, dated Nov. 23, 2011.

Office Action issued in corresponding Chinese Patent Application No. 200510084543.7, dated May 9, 2012.

Office Action issued in corresponding Japanese Patent Application No. 2005-110917, dated Dec. 3, 2010.

Offer of Information issued in corresponding Japanese Patent Application No. 2005-110917, dated Feb. 22, 2011.

Office Action issued in corresponding Japanese Patent Application No. 2005-110917, dated Aug. 1, 2011.

Office Action issued in corresponding Japanese Patent Application No. 2005-110917, dated Dec. 7, 2011.

Offer of Information issued in corresponding Japanese Patent Application No. 2005-110917, dated Dec. 8, 2011.

Office Action issued in corresponding Japanese Patent Application No. 2009-025085, dated Dec. 7, 2011.

Office Action issued in corresponding Taiwanese Patent Application No. 099138332, dated Feb. 10, 2011.

Office Action issued in corresponding Taiwanese Patent Application No. 099138332, dated Sep. 6, 2011.

Office Action issued in corresponding Japanese Patent Application No. 2005-070742, dated Dec. 3, 2010.

Office Action issued in corresponding Japanese Patent Application No. 2005-070742, dated Aug. 1, 2011.

Notice of Final Rejection issued in corresponding Japanese Patent Application No. 2005-070742, dated May 8, 2012.

Examination Report dated Aug. 6, 2012 in corresponding Taiwanese Patent Application No. 095132686.

First Office Action dated Aug. 30, 2012 in corresponding Chinese patent application No. 201110204991.1.

* cited by examiner

*Primary Examiner* — Michael Pepitone
(74) *Attorney, Agent, or Firm* — Knobbe Martens Olson & Bear LLP

(57) ABSTRACT

An object of the present invention is to provide an antistatic pressure-sensitive adhesive composition which is excellent in antistatic property and antistatic property with time of a non-electrification-prevented adherend (subject to be protected) upon peeling, and has reduced stainability in an adherend and is excellent in adhesion reliance, and electrification preventing pressure-sensitive adhesive sheets using the same. There is provided a pressure-sensitive adhesive composition comprising an ionic liquid, and a (meth)acryl-based polymer containing, as a monomer component, 0.01 to 20% by weight of a reactive surfactant shown by the following general formula (I) as a monomer nit.

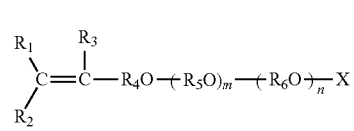

[in the formula (I), $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 0 to 100 (may not be an integer), m+n indicates the number of 1 to 150 (may not be an integer), and X indicates hydrogen or an anionic hydrophilic group]

18 Claims, 1 Drawing Sheet

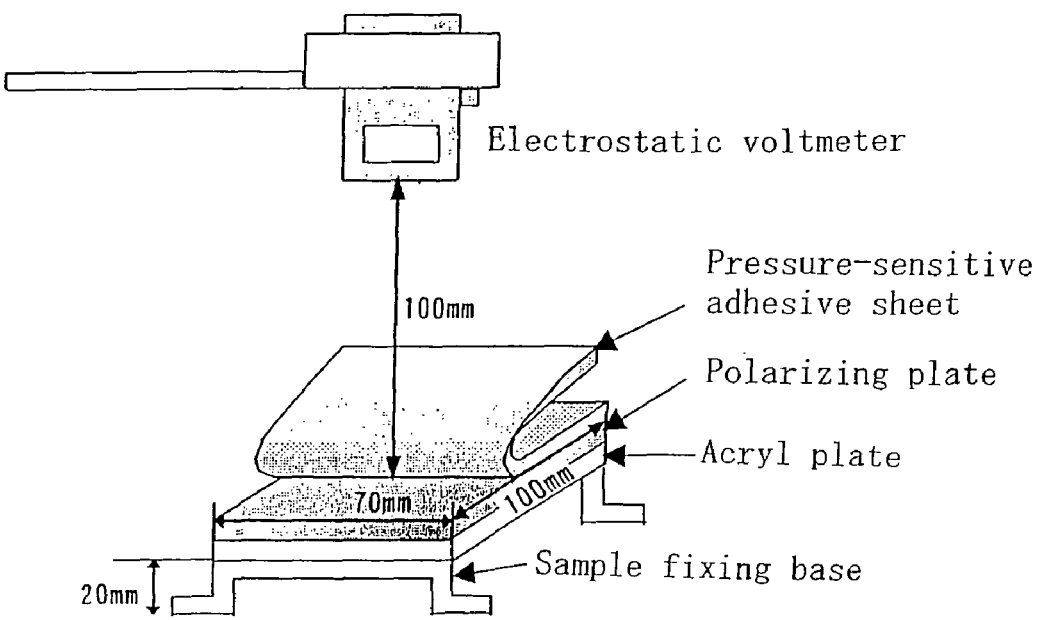

PRESSURE-SENSITIVE ADHESIVE COMPOSITIONS, PRESSURE-SENSITIVE ADHESIVE SHEETS AND SURFACE PROTECTING FILMS

BACKGROUND OF THE INVENTION

1. Field of the Invention

The present invention relates to a pressure-sensitive adhesive composition having antistatic property, and pressure-sensitive adhesive sheets and a surface protecting film obtained by formulating into a form of a sheet or a tape using the composition.

Pressure-sensitive sheets comprising an antistatic pressure-sensitive adhesive composition of the present invention is suitably used in plastic products on which static electricity is easily generated. Among them, particularly, the sheets are useful as antistatic pressure-sensitive adhesive sheets used in utilities disliking static electricity such as an electronic instrument, as well as a surface protecting film used for the purpose of protecting an optical member surface such as a polarizing plate, a wavelength plate, an optical compensating film, a light diffusion sheet and a reflecting sheet.

2. Description of the Related Art

A surface protecting film is generally used for the purpose of preventing a scratch or a stain produced at processing or conveyance of a subject to be protected by applying to a subject to be protected via a pressure-sensitive adhesive layer coated on a protecting film side. For example, for the purpose of preventing a scratch or a stain, a surface protecting film is applied to an optical member such as a polarizing plate and a wavelength plate used in a panel of a liquid crystal display via a pressure-sensitive adhesive layer.

When a liquid crystal display is produced with these optical members, since a surface protecting film become unnecessary, it is peeled and removed from an optical member. Since the aforementioned optical member, pressure-sensitive adhesive, and surface protecting film are constructed of a plastic material, they have high electrical insulating property and generate static electricity upon friction or peeling. Therefore, also when a surface protecting film is peeled from an optical member, static electricity is generated. Therefore, also when a protecting film is peeled from an optical member such as a polarizing plate, static electricity is generated. When a voltage is applied to a liquid crystal in the state where static electricity remains, orientation of a liquid crystal molecule is lost, and a defect of a panel is generated. Then, in order to prevent such the disadvantage, a surface protecting film is subjected to various antistatic treatments.

Previously, as an attempt to suppress the aforementioned electrification of static electricity, for example, a method of preventing electrification by adding a low-molecular surfactant to a pressure-sensitive adhesive, and transferring a surfactant from a pressure-sensitive adhesive to an adherend has been disclosed (for example, see Patent Publication 1). However, the low-molecular surfactant is easily bled on a surface of a pressure-sensitive adhesive agent and, when applied to a protecting film, staining of an adherend is feared. Therefore, when a pressure-sensitive adhesive with a low-molecular surfactant added thereto is applied to a protecting film for an optical member, there is a problem that optical property of an optical member is deteriorated.

In addition, a method of adding an antistatic agent comprising polyether polyol and alkali metal salt to an acryl pressure-sensitive adhesive to suppress an antistatic agent from bleeding on a surface of a pressure-sensitive adhesive has been disclosed (for example, see Patent Publication 2). However, also in this method, bleeding of an antistatic agent is not avoided, and it has been found out that, when applied to a surface protecting film, staining of an adherend occurs with time or under a high temperature.

Furthermore, a method for providing antistatic to the base polymer itself of a pressure-sensitive adhesive composition is disclosed as a means for reducing the aforementioned staining (see, for example, Patent Publication 3). In this disclosure, a pressure-sensitive adhesive composition made of a (meth)acryl-based polymer that contains a reactive surfactant is cited. However, great effects of suppressing the peeling electrification voltage on the adherend side that has not been electrification-prevented, according to this method, are not recognized, and as a result, it has been found that it is difficult to reduce staining and at the same time suppress the peeling electrification voltage on the adherend side that has not been electrification-prevented.

[Patent Publication 1] JP-A No.9-165460
[Patent Publication 2] JP-A No.6-128539
[Patent Publication 3] JP-A No.9-208910

SUMMARY OF THE INVENTION

In light of such the circumstances, an object of the present invention is to solve problems to provide an antistatic pressure-sensitive adhesive composition which is excellent in antistatic property and antistatic property with time of a non-electrification-prevented adherend (subject to be protected) upon peeling, and has reduced stainability in an adherend and is excellent in adhesion reliance, and electrification preventing pressure-sensitive adhesive sheets using the same.

Summary of the Invention

In order to solve the aforementioned problems, the present inventors intensively studied and, as a result, found out that the aforementioned object can be attained by a pressure-sensitive adhesive composition shown below, which resulted in completion of the present invention.

That is, a pressure-sensitive adhesive composition of the present invention is characterized in that it comprises an ionic liquid, and a (meth)acryl-based polymer containing, as a monomer component, 0.01 to 20% by weight of a reactive surfactant shown by the following general formula (I) as a monomer unit.

$$\begin{array}{c}R_1\\ \phantom{R}\diagdown\\ \phantom{RRR}C=C-R_4O-(R_5O)_m-(R_6O)_n-X\\ \phantom{R}\diagup\phantom{RR}|\\ R_2\phantom{RRRR}R_3\end{array} \qquad (I)$$

[in the formula (I), $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 0 to 100 (may not be an integer), m+n indicates the number of 1 to 150 (may not be an integer), and X indicates hydrogen or an anionic hydrophilic group]

According to the pressure-sensitive adhesive composition of the present invention, as shown in results of Example, since 0.01 to 20% by weight of specific reactive surfactants is a monomer component, and an ionic liquid is further contained, in a pressure-sensitive adhesive layer obtained by crosslinking this, staining property on an adherend (subject to be protected) is reduced, and antistatic property of an adherend (subject to be protected) upon peeling, especially antistatic property of non-electrification-prevented adherend (subject to be protected), becomes excellent. Although details of reasons why a crosslinked base polymer using the aforementioned monomer component as a monomer component manifests such the property are not clear, it is presumed that, in contrast to ordinary reactive surfactans, by coordination of an ether group in an base polymer backbone with an ionic liquid, bleeding of an ionic liquid becomes difficult, and both of excellent antistatic property with time and low staining property are realized.

The ionic liquid in the present invention refers to a melt salt (ionic compound) exhibiting the liquid state at room temperature (25° C.).

According to the present invention, by use of the aforementioned ionic liquid as an antistatic agent, a pressure-sensitive adhesive composition in which bleeding of an antistatic agent is suppressed, and adhesion reliance to an adherend with time or even under a high temperature is excellent, is obtained. Although the reason why bleeding can be suppressed using an ionic liquid is not clear, it is presumed to be the high compatibility with a base polymer in comparison with surfactants or the like. In addition, an ionic liquid itself exhibits high conductivity, and therefore, sufficient antistatic properties can be gained, even when staining on a surface of an adherend is microscopic.

In addition, the aforementioned ionic liquids are preferably in the state of liquid at room temperature, and therefore, addition to, diffusion in, and dissolving in pressure-sensitive adhesive compositions can be easily carried out, in comparison with solid salts. Furthermore, the ionic liquid has no vapor pressure (non-volatile), and therefore, it does not vanish with time, and antistatic properties are maintained.

In the present invention, a (meth)acryl-based polymer containing, as a monomer component, 0.01 to 20% by weight of a reactive surfactant shown by the following general formula (I) as a monomer unit is used as a base polymer.

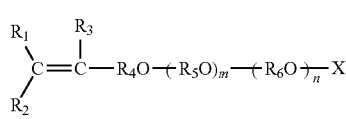
(I)

[in the formula (I), $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 0 to 100 (may not be an integer), m+n indicates the number of 1 to 150 (may not be an integer), and X indicates hydrogen or an anionic hydrophilic group]

The (meth)acryl-based polymer in the present invention refers to an acryl-based polymer and/or a methacryl-based polymer. In addition, the alkyl (meth)acrylate refers to an alkyl acrylate and/or an alkyl methacrylate, and, the (meth) acrylate refers to an acrylate and/or a methacrylate.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (D). By an ionic liquids having these cations, further excellent antistatic ability is obtained.

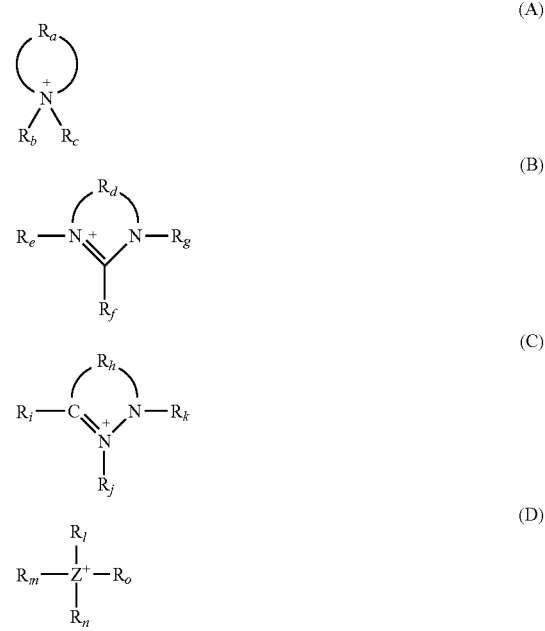

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

A pressure-sensitive adhesive composition of the present invention can suitably contain an ether group-containing compound. The pressure-sensitive adhesive composition may become a pressure-sensitive adhesive composition further excellent in antistatic property by containing the above-mentioned ether group-containing compound. Although it is not clear that the reason why the antistatic property is improved by the use of an ether group-containing compound, through using together an ether group-containing compound improves the wettability to nonpolar materials such as fluoro resin and the transfer of an ionic liquid to an adherend can be carried out effectively.

On the other hand, a pressure-sensitive adhesive layer of the present invention is characterized in that the aforementioned pressure-sensitive adhesive composition is crosslinked. By performing crosslinking by appropriately regulating a constitutional unit and a constitutional ratio of a (meth)acryl-based polymer, selection of a crosslinking agent, and an addition ratio, a surface protecting film more excellent in heat resistance and weather resistance can be obtained.

In addition, a pressure-sensitive adhesive sheet is characterized in that the sheet has a pressure-sensitive adhesive layer, which is formed by crosslinking a pressure-sensitive adhesive composition as defined above on one side or both sides of a support. According to the pressure-sensitive adhesive sheet of the present invention, since the pressure-sensitive adhesive composition of the present invention exerting the aforementioned action and effect is used, electrification of an adherend (subject to be protected) which has not electrification-prevented can be prevented upon peeling, and a pressure-sensitive adhesive sheet which can reduce staining property on an adherend (subject to be protected), and excellent adhesion reliance can be obtained.

A pressure-sensitive adhesive sheet of the present invention includes those in the forms of a sheet, a tape, and a film state such as a pressure-sensitive adhesive tape, a double-sided pressure-sensitive adhesive tape, and a pressure-sensitive adhesive film, as well as a pressure-sensitive adhesive sheet.

Furthermore, when the pressure-sensitive adhesive composition of the present invention is applied to a surface protecting film, it is preferable that a plastic substrate used in a protecting film is antistatic-treated. By subjecting the plastic film to electrification preventing treatment, more excellent antistatic property is obtained.

BRIEF DESCRIPTION OF THE DRAWING

FIG. 1 is a schematic construction view of an electrostatic measuring part used for measuring a peeling electrification voltage in Example.

BEST MODE FOR CARRYING OUT THE INVENTION

Embodiments of the present invention will be explained in detail below.

The pressure-sensitive adhesive composition of the present invention is characterized in that it contains an ionic liquid, and a (meth)acryl-based polymer containing, as a monomer component, 0.01 to 20% by weight of a reactive surfactant shown by the following general formula (I) as a monomer unit.

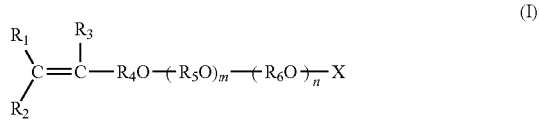

[in the formula (I), $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 0 to 100 (may not be an integer), m+n indicates the number of 1 to 150 (may not be an integer), and X indicates hydrogen or an anionic hydrophilic group]

The ionic liquid in the present invention refers to a melt salt (ionic compound) exhibiting the liquid state at room temperature (25° C.).

As the ionic liquid, a nitrogen-containing onium salt, a sulfur-containing onium salt or a phosphorus-containing onium salt is preferably used. In particular, since excellent antistatic ability is obtained, an ionic liquid comprising an organic cation component represented by the following general formulas (A) to (D), and an anion component is preferably used.

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

Examples of the cation represented by the formula (A) include a pyridinium cation, a piperidinium cation, a pyrrolidinium cation, a cation having a pyrroline skeleton, and a cation having a pyrrole skeleton.

Specific examples include, for example, 1-ethylpyridinium cation, 1-butylpyridinium cation, 1-hexylpyridinium cation, 1-butyl-3-methylpyridinium cation, 1-butyl-4-methylpyridinium cation, 1-hexyl-3-methylpyridinium cation, 1-butyl- 3,4-dimethylpyridinium cation, 1,1-dimethylpyrrolidinium cation, 1-methyl-1-ethylpyrrolidinium cation, 1-methyl-1-propylpyrrolidinium cation, 1-methyl-1-butylpyrrolidinium cation, 1-methy-1-pentylpyrrolidinium cation, 1-methyl-1-hexylpyrrolidinium cation, 1-methyl-1-heptylpyrrolidinium cation, 1-ethyl-1-propylpyrrolidinium cation, 1-ethyl-1-butylpyrrolidinium cation, 1-ethyl-1-pentylpyrrolidinium cation, 1-ethyl-1-hexylpyrrolidinium cation, 1-ethyl-1-heptylpyrrolidinium cation, 1,1-dipropylpyrrolidinium cation, 1-propyl-1-butylpyrrolidinium cation, 1,1-dibutylpyrrolidinium cation, 1-propylpiperidinium cation, 1-pentylpiperidinium cation, 1,1-dimethylpiperidinium cation, 1-methyl-1-ethylpiperidinium cation, 1-methyl-1-propylpiperidinium cation, 1-methyl-1-butylpiperidinium cation, 1-methyl-1-pentylpiperidinium cation, 1-methyl-1-hexylpiperidinium cation, 1-methyl-1-heptylpiperidinium cation, 1-ethyl-1-propylpiperidinium cation, 1-ethyl-1-butylpiperidinium cation, 1-ethyl-1-pentylpiperidinium cation, 1-ethyl-1-hexylpiperidinium cation, 1-ethyl-1-heptylpiperidinium cation, 1,1-dipropylpiperidinium cation, 1-propyl-1-butylpiperidinium cation, 1-propyl-1-pentylpiperidinium cation, 1-propyl-1-hexylpiperidinium cation, 1-propyl-1-heptylpiperidinium cation, 1,1-dibutylpiperidinium cation, 1-butyl-1-pentylpiperidinium cation, 1-butyl-1-hexylpiperidinium cation, 1-butyl-1-heptylpiperidinium cation, 2-methyl-1-pyrroline cation, 1-ethyl-2-phenylindole cation, 1,2-dimethylindole cation, and 1-ethylcarbazole cation.

Examples of the cation represented by the formula (B) include an imidazolium cation, a tetrahydropyrimidinium cation, and a dihydropyrimidinium cation.

Specific examples include, for example, a 1,3-dimethylimidazolium cation, a 1,3-diethylimidazolium cation, a 1-ethyl-3-methylimidazolium cation, a 1-butyl-3-methylimidazolium cation, a 1-hexyl-3-methylimidazolium cation, 1-ocytl-3-methylimidazolium cation, a I-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihydropyrimidinium cation.

Examples of the cation represented by the formula (C) include a pyrazolium cation, and a pyrazolinium cation.

Specific examples include, for example, a 1-methylpyrazolium cation, a 3-methylpyrazolium cation, and a 1-ethyl-2-methylpyrazolinium cation, 1-ethyl-2,3,5-trimethylpyrazolium cation, 1-propyl-2,3,5-trimethylpyrazolium cation, 1-butyl-2,3,5-trimethylpyrazolium cation.

Examples of the cation represented by the formula (D) include a tetraalkylammonium cation, a trialkylsulfonium cation, a tetraalkylphosphonium cation, and those cations in which a part of the alkyl group is substituted with an alkenyl group, an alkoxyl group, or an epoxy group.

Specific examples include, for example, tetramethylammonium cation, tetraethylammonium cation, tetrapropylammonium cation, tetrabutylammonium cation, tetrapentylammonium cation, tetrahexylammonium cation, tetraheptylammonium cation, triethymethylammonium cation, tributylethylammonium cation, trimethyldecylammonium cation, trioctylmethylammonium cation, tripentylbutylammonium cation, trihexylmethylammonium cation, trihexylpentylammonium cation, triheptylmethylammonium cation, tripentylbutylammonium cation, triheptylhexylammonium cation, dimethyldihexylammonium cation, dipropyldihexylammonium cation, heptyldimethylhexylammonium cation, N,N-diethyl-N-methyl-N-(2-methoxyethyl)ammonium cation, glycidyltrimethylammonium cation, diallyldimethylammonium cation, N,N-dimethyl-N,N-dipropylammonium cation, N,N-dimethyl-N,N-dihexylammonium cation, N,N-diporpyl-N,N-dihexylammonium cation, N,N-dimethyl-N-ethyl-N-propylammonium cation, N,N-dimethyl-N-ethyl-N-butylammonium cation, N,N-dimethyl-N-ethyl-N-pentylammonium cation, N,N-dimethyl-N-ethyl-N-hexylammonium cation, N,N-dimethyl-N-ethyl-N-heptylammonium cation, N,N-dimethyl-N-ethyl-N-nonylammonium cation, N,N-dimethyl-N-propyl-N-butylammonium cation, N,N-dimethyl-N-propyl-N-pentylammonium cation, N,N-dimethyl-N-propyl-N-hexylammonium cation, N,N-dimethyl-N-propyl-N-heptylammonium cation, N,N-dimethyl-N-butyl-N-hexylammonium cation, N,N-dimethyl-N-butyl-N-heptylammonium cation, N,N-dimethyl-N-pentyl-N-hexylammonium cation, trimethylheptylammonium cation, N,N-diethyl-N-methyl-N-propylammonium cation, N,N-diethyl-N-methyl-N-pentylammonium cation, N,N-diethyl-N-methyl-N-heptylammonium cation, N,N-diethyl-N-propyl-N-pentylammonium cation, triethylmethylammonium cation, triethylpropylammonium cation, triethylpentylammonium cation, triethylheptylammonium cation, N,N-dipropyl-N-methyl-N-ethylammonium cation, N,N-dipropyl-N-metyl-N-pentylammonium cation, N,N-dipropyl-N-butyl-N-hexylammonium cation, N,N-dipropyl-N,N-dihexylammonium cation, N,N-dibutyl-N-methyl-N-pentylammonium cation, N,N-dibutyl-N-methyl-N-hexylammonium cation, N,N-dimethyl-N,N-dihexylammonium cation, trioctylmethylammonium cation, N-methyl-N-ethyl-N-propyl-N-pentylammonium cation, trimethylsulfonium cation, triethylsulfonium cation, tributylsulfonium cation, trihexylsulfonium cation, diethylmethylsulfonium cation, dibutylethylsulfonium cation, dimethyldecylsulfonium cation, tetramethylphosphonium cation, tetraethylphosphonium cation, tetrabutylphosphonium cation, tetrapentylphosphonium cation, tetrahexylphosphonium cation, phosphonium cation, tetraheptylphosphonium cation, tetraoctylphosphonium cation, triethylmethylphosphonium cation, tributylethylphosphonium cation, and trimethyldecylphosphonium cation, and the like.

Among them, there are preferably used a tetra alkyl ammonium cation, such as tetraalkylammonium cations such as tetramethylammonium cation, tetraethylammonium cation, tetrapropylammonium cation, tetrabutylammonium cation, tetrapentylammonium cation, tetrahexylammonium cation, tetraheptylammonium cation, triethylmethylammonium cation, tributylethylammonium cation, trimethyldecylammonium cation, trioctylmethylammonium cation, tripentylbutylammonium cation, trihexylmethylammonium cation, trihexylpentylammonium cation, triheptylmethylammonium cation, tripentylbutylammonium cation, triheptylhexylammonium cation, dimethydihexylammonium cation, dipropyldihexylammonium cation, heptyldimethylhexylammonium cation, N,N-diethyl-N-methyl-N-(2-methoxyethyl)ammonium cation, glycidyltrimethylammonium cation, diallyldimethylammonium cation, N,N-dimethyl-N-ethyl-N-propylammonium cation, N,N-dimethyl-N-ethyl-N- butylammonium cation, N,N-dimethyl-N-ethyl-N-pentylammonium cation, N,N-dimethyl-N-ethyl-N-hexylammonium cation, N,N-dimethyl-N-ethyl-N-heptylammonium cation, N,N-dimethyl-N-ethyl-N-nonylammonium cation, N,N-dimethyl-N-propyl-N-butylammonium cation, N,N-dimethyl-N-propyl-N-pentylammonium cation, N,N-dimethyl-N-propyl-N-hexylammonium cation, N,N-dimethyl-N-propyl-N-heptylammonium cation, N,N-dimethyl-N-butyl-N-hexylammonium cation, N,N-dimethyl-N-butyl-N-heptylammonium cation, N,N-dimethyl-N-pentyl-N-hexylammonium cation, trimethylheptylammonium cation, N,N-diethyl-N-methyl-N-propylammonium cation, N,N-diethyl-N-methyl-N-pentylammonium cation, N,N-diethyl-N-methyl-N-heptylammonium cation, N,N-diethyl-N-propyl-N-pentylammonium cation, N,N-dimethyl-N,N-dihexylammonium cation, triethylmethylammonium cation, triethylpropylammonium cation, triethylpentylammonium cation, triethylheptylammonium cation, N,N-dipropyl-N-methyl-N-ethylammonium cation, N,N-dipropyl-N-methyl-N-pentylammonium cation, N,N-dipropyl-N-butyl-N-hexylammonium cation, N,N-dipropyl-N,N-dihexylammonium cation, N,N-dibutyl-N-methyl-N-pentylammonium cation, N,N-dibutyl-N-methyl-N-hexylammonium cation, trioctylmethylammonium cation, and N-methyl-N-ethyl-N-propyl-N-pentylammonium cation, trialkylsulfonium cations such as trimethylsulfonium cation, triethylsulfonium cation, tributylsulfonium cation, trihexylsulfonium cation, diethylmethylsulfonium cation, dibutylethylsulfonium cation, and dimethyldecylsulfonium cation, and tetraalkylphosphonium cations such as tetramethylphosphonium cation, tetraethylphosphonium cation, tetrabutylphosphonium cation, tetrapentylphosphonium cation, tetrahexylphosphonium cation, tetraheptylphosphonium cation, tetraoctylphosphonium cation, triethylmethylphosphonium cation, tributylethylphosphonium cation, and trimethyldecylphosphonium cation.

On the other hand, the anionic component is not particularly limited as far as it satisfies that it becomes an ionic liquid. Specifically, for example, $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, and $(CF_3SO_2)(CF_3CO)N^-$ are used. Among them, in particular, an anionic component containing a fluorine atom is preferably used because a low melting point ionic compound is obtained.

An embodiment of an ionic liquid used in the present invention is used by appropriately selecting from a combination of the aforementioned cation component and anion component.

Specific examples include, for example, 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl) imide, 1-butyl-3-methylpyridinium bis(pentafluoroethanesulfonyl) imide, 1-hexylpyridinium tetrafluoroborate, 1,1-dimethylpyrrolidinium bis(trifluoromethanesulfonyl) imide, 1-methyl-1-ethylpyrrolidinium bis(trifluoromethanesulfonyl) imide, 1-methyl-1-propylpyrrolidinium bis(trifluoromethanesulfonyl) imide, 1-methyl-1-butylpyrrolidinium bis(trifluoromethanesulfonyl) imide, 1-methyl-1-pentylpyrrolidinium bis(trifluoromethanesulfonyl) imide, 1-methyl-1-hexylpyrrolidinium bis(trifluoromethanesulfonyl) imide, 1-methyl-1-heptylpyrrolidinium bis(trifluoromethanesulfonyl) imide, 1,1-diethylpyrrolidinium bis(trifluoromethanesulfonyl) imide, 1-ethyl-1-propylpyrrolidinium bis(trifluoromethanesulfonyl) imide, 1-ethyl-1-butylpyrrolidinium bis(trifluoromethanesulfonyl) imide, 1-ethyl-1-pentylpyrrolidinium bis(trifluoromethanesulfonyl) imide, 1-ethyl-1-hexylpyrrolidinium bis(trifluoromethanesulfonyl) imide, 1-ethyl-1-heptylpyrrolidinium bis(trifluoromethanesulfonyl) imide, 1,1-dipropylpyrrolidinium bis(trifluoromethanesulfonyl) imide, 1-propyl-1-butylpyrrolidinium bis(trifluoromethanesulfonyl) imide, 1-propyl-1-pentylpyrrolidinium bis(trifluoromethanesulfonyl) imide, 1-propyl-1-hexylpyrrolidinium bis(trifluoromethanesulfonyl) imide, 1-propyl-1-heptylpyrrolidinium bis(trifluoromethanesulfonyl) imide, 1,1-dibutylpyrrolidinium bis(trifluoromethanesulfonyl) imide, 1-propylpiperidinium bis(trifluoromethanesulfonyl) imide, 1-pentylpiperidinium bis(trifluoromethanesulfonyl) imide, 1,1-dibutylpiperidinium bis(trifluoromethanesulfonyl) imide, 1-methy-1-ethylpiperidinium bis(trifluoromethanesulfonyl) imide, 1-methyl-1-propylpiperidinium bis(trifluoromethanesulfonyl) imide, 1-methyl-1-butylpiperidinium bis(trifluoromethanesulfonyl) imide, 1-methyl-1-pentylpiperidinium bis(trifluoromethanesulfonyl) imide, 1-methyl-1-hexylpiperidinium bis(trifluoromethanesulfonyl) imide, 1-methyl-1-heptylpiperidinium bis(trifluoromethanesulfonyl) imide, 1,1-diethylpiperidinium bis(trifluoromethanesulfonyl) imide, 1-ethyl-1-propylpiperidinium bis(trifluoromethanesulfonyl) imide, 1-ethyl-1-butylpiperidinium bis(trifluoromethanesulfonyl) imide, 1-ethyl-1-pentylpiperidinium bis(trifluoromethanesulfonyl) imide, 1-ethyl-1-hexylpiperidinium bis(trifluoromethanesulfonyl) imide, 1-ethyl-1-heptylpiperidinium bis(trifluoromethanesulfonyl) imide, 1,1-dipropylpiperidinium bis(trifluoromethanesulfonyl) imide, 1-propyl-1-butylpiperidinium bis(trifluoromethanesulfonyl) imide, 1-propyl-1-pentylpiperidinium bis(trifluoromethanesulfonyl) imide, 1-propyl-1-hexylpiperidinium bis(trifluoromethanesulfonyl) imide, 1-propyl-1-heptylpiperidinium bis(trifluoromethanesulfonyl) imide, 1-propylpiperidinium bis(trifluoromethanesulfonyl) imide, 1-pentylpiperidinium bis(trifluoromethanesulfonyl) imide, 1,1-dibutylpiperidinium bis(trifluoromethanesulfonyl) imide, 1-propylpyrrolidinium bis(pentafluoroethanesulfonyl) imide, 1-pentylpyrrolidinium bis(pentafluoroethanesulfonyl) imide, 1,1-dimethypyrrolidinium bis(pentafluoroethanesulfonyl) imide, 1-methyl-1-ethylpyrrolidinium bis(pentafluoroethanesulfonyl) imide, 1-methyl-1-propylpyrrolidinium bis(pentafluoroethanesulfonyl) imide, 1-methyl-1-butylpyrrolidinium bis(pentafluoroethanesulfonyl) imide, 1-methyl-1-pentylpyrrolidinium bis(pentafluoroethanesulfonyl) imide, 1-methyl-1-hexylpyrrolidinium bis(pentafluoroethanesulfonyl) imide, 1-methyl-1-heptylpyrrolidinium bis(pentafluoroethanesulfonyl) imide, 1,1-diethylpyrrolidinium bis(pentafluoroethanesulfonyl) imide, 1-ethyl-1-propylpyrrolidinium bis(pentafluoroethanesulfonyl) imide, 1-ethyl-1-butylpyrrolidinium bis(pentafluoroethanesulfonyl) imide, 1-ethyl-1-pentylpyrrolidinium bis(pentafluoroethanesulfonyl) imide, 1-ethyl-1-hexylpyrrolidinium bis(pentafluoroethanesulfonyl) imide, 1-ethyl-1-heptylpyrrolidinium bis(pentafluoroethanesulfonyl) imide, 1,1-dipropylpyrrolidinium bis(pentafluoroethanesulfonyl) imide, 1-propyl-1-butylpyrrolidinium bis(pentafluoroethanesulfonyl) imide, 1-propyl-1-pentylpyrrolidinium bis(pentafluoroethanesulfonyl) imide, 1-propyl-1-hexylpyrrolidinium bis(pentafluoroethanesulfonyl) imide, 1-propyl-1-heptylpyrrolidinium bis(pentafluoroethanesulfonyl) imide, 1,1-dibutylpyrrolidinium bis(pentafluoroethanesulfonyl) imide, 1-propylpiperidinium bis(pentafluoroethanesulfonyl) imide, 1-pentylpiperidinium bis(pentafluoroethanesulfonyl) imide, 1,1-dimethylpiperidinium bis(pentafluoroethanesulfonyl) imide, 1-methyl-1-ethylpiperidinium bis(pentafluoroethanesulfonyl) imide, 1-methyl-1-propylpiperidinium bis(pentafluoroethanesulfonyl) imide, 1-methyl-1-butylpiperidinium bis(pentafluoroethanesulfonyl) imide, 1-methyl-1-pentylpiperidinium bis(pentafluoroethanesulfonyl) imide, 1-methyl-1-hexylpiperidinium bis(pentafluoroethanesulfonyl) imide, 1-methyl-1-heptylpiperidinium bis(pentafluoroethanesulfonyl) imide, 1,1-diethylpiperidinium bis(pentafluoroethanesulfonyl) imide, 1-ethyl-1-propylpiperidinium bis(pentafluoroethanesulfonyl) imide, 1-ethyl-1-butylpiperidinium bis(pentafluoroethanesulfonyl) imide, 1-ethyl-1-pentylpiperidinium bis(pentafluoroethanesulfonyl) imide, 1-ethyl-1-hexylpiperidinium bis(pentafluoroethanesulfonyl) imide, 1-ethyl-1-heptylpiperidinium bis(pentafluoroethanesulfonyl) imide, 1,1-dipropylpiperidinium bis(pentafluoroethanesulfonyl) imide, 1-propyl-1-butylpiperidinium bis(pentafluoroethanesulfonyl) imide, 1-propyl-1-pentylpiperidinium bis(pentafluoroethanesulfonyl) imide, 1-propyl-1-hexylpiperidinium bis(pentafluoroethanesulfonyl) imide, 1-propyl-1-heptylpiperidinium bis(pentafluoroethanesulfonyl) imide, 1,1-dibutylpiperidinium bis(pentafluoroethanesulfonyl) imide, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium hexafluorophosphate, 1-ethyl-3-methylimidazolium tetrafluoroborate, 1-ethyl-3-methylimidazolium acetate, 1-ethyl-3-methylimidazolium heptafluorobutylate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl) imide, 1-ethyl-3-methylimidazolium bis(pentafluoroethanesulfonyl) imide, 1-ethyl-3-methylimidazolium tris(trifluoromethanesulfonyl) methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutylate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl) imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl) imide, 1-methylpyrazolium tetrafluoroborate, 3-methylpyrazolium tetrafluoroborate, 1-ethyl-2,3,5-trimethylpyrazolium bis(trifluoromethanesulfonyl) imide, 1-propyl-2,3,5-trimethypyrazolium bis(trifluoromethanesulfonyl) imide, 1-butyl-2,3,5-trimethylpyrazolium bis(trifluoromethanesulfonyl) imide, 1-ethyl-2,3,5-trimethylpyrazolium bis(pentafluoroethanesulfonyl) imide, 1-propyl-2,3,5-trimethypyrazolium bis(pentafluoroethanesulfonyl) imide, 1-butyl-2,3,5-trimethylpyrazolium bis(pentafluoroethanesulfonyl) imide, 1-ethyl-2,3,5-trimethylpyrazolium bis(trifluoromethanesulfonyl) trifluoroacetamide, 1-propyl-2,3,5-trimethylpyrazolium bis(trifluoromethanesulfonyl) trifluoroacetamide, 1-butyl-2,3,5-trimethylpyrazolium bis(trifluoromethanesulfonyl) trifluoroacetamide, N,N-dimethyl-N-ethyl-N-propylammonium bis(trifluoromethanesulfonyl) imide, N,N-dimethyl-N-ethyl-N-butylammonium bis(trifluoromethanesulfonyl) imide, N,N-dimethyl-N-ethyl-N-pentylammonium bis(trifluoromethanesulfonyl) imide, N,N-dimethyl-N-ethyl-N-hexylammonium bis(trifluoromethanesulfonyl) imide, N,N-dimethyl-N-ethyl-N-heptylammonium bis(trifluoromethanesulfonyl) imide, N,N-dimethyl-N-ethyl-N-nonylammonium bis(trifluoromethanesulfonyl) imide, N,N-dimethyl-N,N-dipropylammonium bis(trifluoromethanesulfonyl) imide, N,N-dimethyl-N-propyl-N-butylammonium bis(trifluoromethanesulfonyl) imide, N,N-dimethyl-N-propyl-N-pentylammonium bis(trifluoromethanesulfonyl) imide, N,N-dimethyl-N-propyl-N-hexylammonium bis(trifluoromethanesulfonyl) imide, N,N-dimethyl-N-propyl-N-heptylammonium bis(trifluoromethanesulfonyl) imide, N,N-dimethyl-N-butyl-N-hexylammonium bis(trifluoromethanesulfonyl) imide, N,N-dimethyl-N-butyl-N-heptylammonium bis(trifluoromethanesulfonyl) imide, N,N-dimethyl-N-pentyl-N-hexylammonium bis(trifluoromethanesulfonyl) imide, N,N-dimethyl-N,N-dihexylammonium bis(trifluoromethanesulfonyl) imide, trimethylheptylammonium bis(trifluoromethanesulfonyl) imide, N,N-diethyl-N-methyl-N-propylammonium bis(trifluoromethanesulfonyl) imide, N,N-diethyl-N-methyl-N-pentylammonium bis(trifluoromethanesulfonyl) imide, N,N-diethyl-N-methyl-N-heptylammonium bis(trifluoromethanesulfonyl) imide, N,N-diethyl-N-propyl-N-pentylammonium bis(trifluoromethanesulfonyl) imide, triethylpropylammonium bis(trifluoromethanesulfonyl) imide, triethylpentylammonium bis(trifluoromethanesulfonyl) imide, triethylheptylammonium bis(trifluoromethanesulfonyl) imide, N,N-dipropyl-N-methyl-N-ethylammonium bis(trifluoromethanesulfonyl) imide, N,N-dipropyl-N-methyl-N-pentylammonium bis(trifluoromethanesulfonyl) imide, N,N-dipropyl-N-butyl-N-hexylammonium bis(trifluoromethanesulfonyl) imide, N,N-dipropyl-N,N-dihexylammonium bis(trifluoromethanesulfonyl) imide, N,N-dibutyl-N-methyl-N-pentylammonium bis(trifluoromethanesulfonyl) imide, N,N-dibutyl-N-methyl-N-hexylammonium bis(trifluoromethanesulfonyl) imide, trioctylmethylammonium bis(trifluoromethanesulfonyl) imide, N-methyl-N-ethyl-N-propyl-N-pentylammonium bis(trifluoromethanesulfonyl) imide, 1-butylpyridinium (trifluoromethanesulfonyl) triflyoroacetamide, 1-butyl-3-methylpyridinium (trifluoromethanesulfonyl) triflyoroacetamide, 1-ethyl-3-methylimidazolium (trifluoromethanesulfonyl) triflyoroacetamide, tetrahexylammonium bis(trifluoromethanesulfonyl) imide, N,N-diethyl-N-methyl-N-(2-methoxyethyl)ammonium tetrafluoroborate, N,N-diethyl-N-methyl-N-(2-methoxyethyl)ammonium bis(trifluoromethanesulfonyl) imide, diallydimethylammonium tetrafluoroborate, diallydimethylammonium trifluoromethanesulfonate, diallydimethylammonium bis(trifluoromethanesulfonyl) imide, diallydimethylammonium bis(pentafluoroethanesulfonyl) imide, glycidyltrimethylammonium trifluoromethanesulfonate, glycidyltrimethyammonium bis(trifluoromethanesulfonyl) imide, grycidyltrimethyammonium bis(pentafluoroethanesulfonyl) imide, diallydimethylammonium (trifluoromethanesulfonyl) trifluoroacetamide, glycidyltrimethylammonium (trifluoromethanesulfonyl) trifluoroacetamide, diallydimethylammonium bis(pentafluoroethanesulfonyl) imide, diallydimethyl bis(pentafluoroethanesulfonyl) imide, 1-octyl-3-methylimidazolium chloride, 1-decyl-3-methylimidazolium chloride, 1-dodecyl-3-methylimidazolium chloride, 1-tetradodecyl-3-methylimidazolium chloride, 1-hexadodecyl-3-methylimidazolium chloride, 1-hexyl-2,3-dimethylimidazolium bromide, 1-hexyl-2,3-dimethylimidazolium chloride, 1-butylpyridinium trifluoromethane-sulfonate, 1-hexylpyridinium bromide, 1-hexylpyridinium chloride, and the like.

Among them, there are preferably used an ammonium cation, such as cyclic nitrogen atom-containing onium cation components. By use of those cyclic nitrogen atom-containing onium cation components, the peeling electrification voltage of the adherend (subject to be protected) can be efficiently redused although the content of the ionic liquid in the pressure-sensitive adhesive composition(and the pressure-sensitive adhesive layer) is lesser. And the cyclic nitrogen atom-containing onium cations can be an aromatic compounds and compounds which are saturated or have degree of saturation.

As the aforementioned ionic liquid, a commercially available ionic liquid may be used, or the liquid may be synthesized as described below.

A method of synthesizing an ionic liquid is not particularly limited as far as an objective ionic liquid is obtained. Generally, a halide method, a hydroxide method, an acid ester method, a chelate forming method, and a neutralization method described in the publication "Ionic liquid-The Front and Future of Development-" (published by CMC) are used.

Regarding a halide method, a hydroxide method, an acid ester method, a chelate forming method, and a neutralization method, a synthesis method using an example of a nitrogen-containing onium salt will be shown below, but other ionic liquid such as a sulfur-containing onium salt, and a phosphorus-containing onium salt can be obtained by the similar procedure.

The halide method is a method which is performed by a reaction shown in the following formulas (1) to (3). First, a tertiary amine and alkyl halide are reacted to obtain halide (Reaction Equation (1), as a halogen, chlorine, bromine or iodine is used).

The resulting halide is reacted with an acid (HA) having an anion structure (A$^-$) of an objective ionic liquid or a salt (MA, M is a cation forming a salt with an objective anion such as ammonium, lithium, sodium and potassium) of an objective ionic liquid to obtain an objective ionic liquid ($R_4NA$).

$R_3N+RX \rightarrow R_4NX$ (X: Cl, Br, I)  (1)

$R_4NX+HA \rightarrow R_4NA+HX$  (2)

$R_4NX+MA \rightarrow R_4NA+MX$ (M: $NH_4$, Li, Na, K, Ag etc.)  (3)

The hydroxide method is a method performed by a reaction shown in (4) to (8).

First, a halide ($R_4NX$) is subjected to ion exchange membrane method electrolysis (reaction equation (4)), an OH-type ion exchange resin method (reaction equation (5)) or a reaction with silver oxide ($Ag_2O$) (reaction equation (6)) to obtain a hydroxide ($R_4NOH$) (as a halogen, chlorine, bromine or iodine is used).

The resulting hydroxide is subjected to a reaction of reaction equations (7) to (8) as in the aforementioned halide method to obtain an objective ionic liquid ($R_4NH$).

$R_4NX+H_2O \rightarrow R_4NOH+1/2H_2+1/2X_2$ (X: Cl, Br, I)  (4)

$R_4NX+P-OH \rightarrow R_4NOH+P-X$ (P-OH: OH-type ion exchange resin)  (5)

$R_4NX+1/2Ag_2O+1/2H_2O \rightarrow R_4NOH+AgX$  (6)

$R_4NOH+HA \rightarrow R_4NA+H_2O$  (7)

$R_4NOH+MA \rightarrow R_4NA+MOH$ (M: $NH_4$, Li, Na, K, Ag etc.)  (8)

The acid ester method is a method performed by a reaction shown in (9) to (11). First, tertiary amine ($R_3N$) is reacted with acid ester to obtain an acid esterified substance (reaction equation (9)), as acid ester, ester of an inorganic acid such as sulfinuric acid, sulfurous acid, phosphoric acid, phosphorous acid, and carbonic acid, or ester of organic acid such as methanesulfonic acid, methylphosphonic acid and formic acid is used).

The resulting acid esterified substance is subjected to a reaction of reaction equations (10) to (11) as in the aforementioned halide method, to obtain an objective ionic liquid ($R_4NA$). Alternatively, as acid ester, methyl trifluoromethane sulfonate, or methyl trifluoroacetate may be used to directly obtain an ionic liquid.

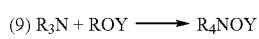

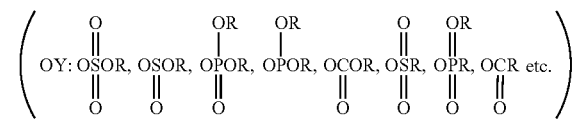

$R_4NOY+MA \rightarrow R_4NA+MOY$ (M: $NH_4$, Li, Na, K, Ag etc.)  (11)

The chelate forming method is a method performed by a reaction as shown in (12) to (15). First, halide of quaternary ammonium ($R_4NX$), hydroxide of quaternary ammonium ($R_4NOH$), or carbonic acid esterified substance of quaternary ammonium ($R_4NOCO_2CH_3$) is reacted with hydrogen fluoride (HF) or ammonium fluoride ($NH_4F$) to obtain a quaternary ammonium fluoride salt (reaction equation (12) to (14)).

The resulting quaternary ammonium fluoride salt can be subjected to a chelate forming reaction with fluoride such as $BF_3$, $AlF_3$, $PF_5$, $ASF_5$, $SbF_5$, $NbF_5$ and $TaF_6$, to obtain an ionic liquid (reaction equation (15)).

$R_4NX+HF \rightarrow R_4NF+HX$ (X: Cl, Br, I)  (12)

$R_4NY+HF \rightarrow R_4NF+HY$ (Y: OH, $OCO_2CH_3$)  (13)

$R_4NY+NH_4F \rightarrow R_4NF+NH_3+HY$ (Y: OH, $OCO_2CH_3$)  (14)

$R_4NF+MF_{n-1} \rightarrow R_4NMF_n$  (15)

($MF_{n-1}$: $BF_3$, $AlF_3$, $PF_5$, $ASF_5$, $SbF_5$, $NbF_5$, $TaF_5$ etc.)

The neutralization method is a method performed by a reaction shown in (16). An ionic liquid can be obtained by reacting tertiary amine and an organic acid such as $HBF_4$, $HPF_6$, $CH_3COOH$, $CF_3COOH$, $CF_3SO_3H$, $(CF_3SO_2)_2NH$, $(CF_3SO_2)_3CH$, and $(C_2F_5SO_2)_2NH$.

$R_3N+HZ \rightarrow R_3HN^+Z^-$  (16)

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_5SO_2)_2NH$ organic acid such as]

The aforementioned R represents hydrogen or a hydrocarbon group of a carbon number of 1 to 20, and may contain a hetero atom.

Since an amount of an ionic liquid to be blended varies depending on compatibility between a polymer and an ionic liquid to be used, the amount can not be always indiscriminately defined, but generally is preferably 0.01 to 40 parts by weight, more preferably 0.01 to 30 parts by weight, more preferably 0.03 to 20 parts by weight, much more preferably 0.03 to 10 parts by weight, further more preferably 0.03 to 4.9 parts by weight, most preferably 0.05 to 2 parts by weight relative to 100 parts by weight of a base polymer. When the amount is less than 0.01 part by weight, sufficient antistatic property is not obtained and, when the amount exceeds 40 parts by weight, there is a tendency that staining on an adherend is increased.

The pressure-sensitive adhesive composition of the present invention is characterized in that it contains an ionic liquid, and a (meth)acryl-based polymer containing, as a monomer component, 0.01 to 20% by weight of a reactive surfactant shown by the following general formula (I) as a monomer unit.

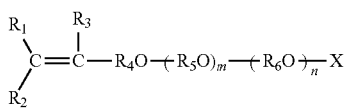
(I)

[in the formula (I), $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 0 to 100 (may not be an integer), m+n indicates the number of 1 to 150 (may not be an integer), and X indicates hydrogen or an anionic hydrophilic group]

The aforementioned (meth)acryl-based polymer used in the present invention is not particularly limited as far as it is a (meth)acryl-based polymer having pressure-sensitive adhering property corresponding to the aforementioned property.

In the reactive surfactant shown by the above-mentioned formula (I), $R_4$ is preferable to be an alkylene group of 0 to 10 in carbon number, and especially preferable to be an alkylene group of 0 to 4 in carbon number. Further, the case of 0 in carbon number means that there is no $R_4$.

Alkylene groups of 1 to 4 in carbon number include the methylene group, the ethylene group, the 1,2-propylene group, the 1,3-propylene group, the dimethyl methylene group, the 1,2-butylene group, the 2,3-butylene group, the 1,3-butylene group, the 1,4-butylene group, and the isobutylene group.

In the reactive surfactants shown by the above-mentioned formula (I), $R_5$ is preferable to be an alkylene group of 2 to 20 in carbon number, and especially preferable to be an alkylene group of 3 to 18 in carbon number or an alkoxy methyl ethylene group shown by the following formula (II) or (III).

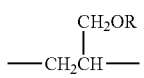
(II)

[R in the formula (II) indicates an alkyl group of 1 to 18 in carbon number.]

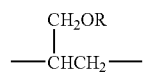
(III)

[R in the formula (III) indicates an alkylene group of 1 to 18 in carbon number.]

An alkylene groups of 3 to 18 in carbon number include, for example, the 1,2-propylene group, the 1,3-propylene group, the 1,2-butylene group, the 2,3-butylene group, the 1,3-butylene group, the 1,4-butylene group, the isobutylene group, the pentylene group, the hexylene group, the heptylene group, the octylene group, the nonylene group, the decylene group, the dodecylene group, the tetradecylene group, the hexadecylene group, and the octadecylene group.

An alkyl groups of 1 to 18 in carbon number include, for example, the methyl group, the ethyl group, the propyl group, the 2-methyl propyl group, the n-butyl group, the s-butyl group, the t-butyl group, the isobutyl group, the pentyl group, the 3-methyl pentyl group, the hexyl group, the 2-ethyl hexyl group, the heptyl group, the octyl group, the nonyl group, the decyl group, the tetradecyl group, the hexadecyl group, and the octadecyl group.

In the reactive surfactants shown by the above-mentioned formula (I), $R_6$ is preferable to be an alkylene group of 1 to 4 in carbon number, and especially preferable to be the ethylene group of 2 in carbon number.

In the reactive surfactants shown by the above-mentioned formula (I), m pieces of ($R_5O$) groups and n pieces of ($R_6O$) groups may be any bonding form of block bonding, random bonding, and the like, respectively, and further may be the bonding form of combining block bonding and random bonding. Moreover, in case of block bonding, the order of arranging the ($R_5O$) groups and the ($R_6O$) groups may be any order. Further, m pieces of ($R_5O$) groups may be the same or different, and in cases where ($R_5O$) groups are different, any bonding form of block bonding, random bonding, and further of combining block bonding and random bonding can be acceptable.

The symbol of m indicates the average number of moles added of an oxyalkylene group or an alkoxymethyl oxyethylene group, showing the number of 0 to 50 (may not be an integer), and m is preferable to be in the range of 0 to 40, and especially preferable to be in the range of 0 to 20.

The symbol of n indicates the average number of moles added of an oxyalkylene group, showing the number of 0 to 100 (may not be an integer), and n is preferable to be in the range of 1 to 70, and especially preferable to be in the range of 5 to 50.

Moreover, m and n are not 0 at the same time, and m+n is the number of 1 to 150 (may not be an integer).

In the reactive surfactants shown by the above-mentioned formula (I), X indicates hydrogen or an anionic hydrophilic group.

Anionic hydrophilic groups include, for example, those shown by the following formula (IV) or (V).

—$SO_3M_1$ (IV)

[M₁ in the formula (IV) indicates any of hydrogen, alkali metals, alkaline earth metals, the ammonium group, and alkanol ammonium groups.]

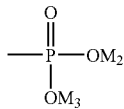

(V)

[M₂ and M₃ in the formula (V) indicate likewise or differently any of hydrogen, alkali metals, alkaline earth metals, the ammonium group, and alkanol ammonium groups, respectively.]

Specific examples of the above-mentioned reactive surfactants include, for example, Latemul PD-104 (manufactured by Kao Corp.), Latemul PD-420 (manufactured by Kao Corp.), Latemul PD-430 (manufactured by Kao Corp.), and Latemul PD-450 (manufactured by Kao Corp.).

Although reactive surfactants may be used separately and may be used in the mixture of two or more kinds, the amount of them is preferable to be 0.01 to 20% by weight in the total monomer components of (meth)acryl polymers, more preferable to be 0.05 to 10% by weight, and especially preferable to be 0.1 to 5% by weight. When the content of the reactive surfactant is less than 0.01% by weight, it is not preferable because the effect of inhibiting the ionic liquid bleeding and the effect of decreasing the staining of the subject to be protected in the present invention cannot be obtained sufficiently. On the other hand, when the content is over 20% by weight, it is not preferable because the effect of inhibiting the ionic liquid bleeding becomes high and the antistatic effect is decreased.

Futhermore, in the present invention, in addition to the aforementioned reactive surfactant monomer component, (meth)acryl-based monomer components having an alkyl group of a carbon number of 1 to 14 and other polymerizable monomer components for regulating the glass transition temperature and the peeling properties of the (meth)acryl-based polymer can be utilized.

Specific examples of (meth)acrylate having an alkyl group of a carbon number of 1 to 14 include methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate, or the like.

Among them, for applying to the surface protecting films, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate or the like are preferable to use for the present invention.

In the present invention, (meth)acryl-based monomers having an alkyl group of a carbon number of 1 to 14 may be used alone, or two or more kinds may be used by mixing, and a content as a whole is preferably 50 to 99.99% by weight, more preferably 60 to 99% by weight, particularly preferably 70 to 96% by weight in a monomer component of a (meth) acryl-based polymer. By using a (meth)acryl-based monomer having an alkyl group of a carbon number of 1 to 14, better interaction with an ionic liquid, and better adherability can be appropriately regulated.

As other polymerizable monomer component other than aforementioned (meth)acryl-based monomer, a polymerizable monomer for regulating a glass transition point or peelability of a (meth)acryl-based polymer can be used in such a range that the effect of the present invention is not deteriorated.

As other polymerizable monomer component, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhering force or for a crosslinking point, such as a carboxyl group-containing monomer, an acid anhydride group-containing monomer, a hydroxyl group-containing monomer, an amido group-containing monomer, an amino group-containing monomer, an imido group-containing monomer, an epoxy group-containing monomer, vinyl ethers can be appropriately used. Other components may be used alone, or two or more of them may be used by mixing.

Here, when (meth)acrylate having an acid functional group such as a carboxyl group, a sulfonic acid group, and a phosphoric acid group is used, it is preferable to adjust an acid value of a (meth)acryl-based polymer 29 or less. When an acid value of a (meth)acryl-based polymer exceeds 29, there is a tendency that antistatic property is deteriorated.

An acid value can be adjusted by an amount of (meth)acrylate having an acid functional group to be blended, and examples thereof include a (meth)acryl-based polymer obtained by copolymerizing 2-ethylhexyl acrylate as a (meth)acryl-based polymer having a carboxyl group, and acrylic acid. In this case, by adjusting acrylic acid at 3.7 parts by weight relative to a total of 100 parts by weight of 2-ethylhexyl acrylate and acrylic acid, the aforementioned acid value can be satisfied.

Examples of the sulfonic acid group-containing monomer include styrenesulfonic acid, allylsulfonic acid, 2-(meth)acrylamido-2-methylpropanesulfonic acid, (meth)acrylamidopropanesulfonic acid, sulfopropyl (meth)acrylate, (meth)acryloyloxynaphthalenesulfonic acid, and sodium vinylsulfonate.

Examples of the phosphoric acid group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutylvinyl ether, and diethylene glycol monovinyl ether.

Examples of the amido group-containing monomer include acrylamide, methacrylamide, diethylacrylamide, N-vinylpyrrolidone, N,N-dimethylacrylamide, N, N-dimethylmethacrylamide, N,N-diethylacrylamide, N,N-diethylmethacrylamide, N, N'-methylenebisacrylamide, N,N-dimethylaminopropylacrylamide, N, N-dimethylami nopropylmethacrylamide, and diacetoneacrylamide.

Examples of the amino group-containing monomer include aminoethyl (meth)acrylate, N,N-dimethylaminoethyl (meth)acrylate, N,N-dimethylaminopropyl (meth)acrylate, and (meth)acryloylmorpholine.

Examples of the imido group-containing monomer include cyclohexylmaleimide, isopropylmaleimide, N-cyclohexylmaleimide, and itaconeimide.

Examples of the epoxy group-containing monomer include glycidyl (meth)acrylate, methylglycidyl (meth)acrylate, and allyl glycidyl ether.

Examples of vinyl ethers include methyl vinyl ether, ethyl vinyl ether, and isobutyl vinyl ether.

The aforementioned other polymerizable monomer component may be used alone, or two or more kinds may be used by mixing, and a content as a whole is such that a polymerizable monomer component is preferably 0 to 49.99 parts by weight, more preferably 0.5 to 40 parts by weight, particularly preferably 1 to 20 parts by weight relative to 100 parts by weight of a total constituting unit of a (meth)acryl-based polymer. By using the aforementioned other polymerizable monomer component, better interaction with an ionic liquid, and better adherability can be appropriately regulated.

The aforementioned (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste (adhesive residue) remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient, and there is a tendency that this is a cause for peeling off which is generated between a polarizing plate and a pressure-sensitive adhesive composition layer of a surface protecting film. A weight average molecular weight is obtained by measurement with GPC (gel permeation chromatography).

In addition, the aforementioned (meth)acryl-based polymer of which the glass transition temperature (Tg) of is no lower than −100° C. is generally used, and it is preferable for the glass transition temperature to be −90° C. to 0° C., and it is more preferable for it to be −80° C. to −10° C. When a glass transition temperature is higher than 0° C., it becomes difficult to obtain a sufficient adhering property and tends to be a cause for peeling off which is generated between a polarizing plate and a pressure-sensitive adhesive composition layer of a pressure-sensitive adhesive sheet.

Futhermore, a glass transition temperature (Tg) of a (meth)acryl-based polymer can be adjusted in the aforementioned range by appropriating changing a monomer component and a composition ratio to be used.

The aforementioned (meth)acryl-based polymer of the present invention is obtained by a polymerization method which is generally used as a procedure for synthesizing a (meth)acryl-based polymer such as solution polymerization, emulsion polymerization, bulk polymerization and suspension polymerization. In addition, the resulting polymer may be any of a random copolymer, a block copolymer, and a graft copolymer.

In the pressure-sensitive adhesive composition of the present invention, pressure-sensitive adhesive sheets further excellent in heat resistance are obtained by appropriately crosslinking a base polymer, in particular, a (meth)acryl-based polymer. Examples of a specific means for a crosslinking method include a so-called method of using a crosslinking agent, in which a compound having a group reactive with a carboxyl group, a hydroxyl group which is appropriately contained as a crosslinking basal point in a (meth)acrly-based polymer such as an isocyanate compound, an epoxy compound, a melamine-based resin and an aziridine compound is added to react them. Among them, from a viewpoint mainly of obtaining an appropriate cohesive strength, an isocyanate compound and an epoxy compound are particularly preferably used. These compounds may be used alone, or may be used by mixing two or more kinds of them.

Among them, examples of the isocyanate compound include aromatic isocyanate such as tolylene diisocyanate, and xylene diisocyanate, alicycilc isocyanate such as isophorone diisocyanate and aliphatic isocyanate such as hexamethylene diisocyanate.

More specific examples of the isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylene diisocyanate, and isocyanate adducts such as trimethylolpropane/tolylene diisocyanate trimer adduct (trade name: Coronate L manufactured by Nippon Polyurethane Industry Co., Ltd.), trimethylolpropane/hexamethylene diisocyanate trimer adduct (trade name: Coronate HL manufactured by Nippon Polyurethane Industry Co., Ltd.), and isocyanurate of hexamethylene diisocyanate (trade name: Coronate HX manufactured by Nippon Polyurethane Industry Co., Ltd.). These isocyanate compounds may be used alone, or may be used by mixing two or kinds of them.

Examples of the epoxy compound include N,N,N',N'-tetraglycidyl-m-xylenediamine (trade name TETRAD-X manufactured by Mitsubishi Gas Chemical Company, Inc.) and 1,3-bis(N,N-diglycidylaminomethyl)cyclohexane (trade name TETRAD-C manufactured by Mitsubishi Gas Chemical Company Inc.). These compounds may be used alone, or may be used by mixing two or more kinds.

Examples of the melamine-based resin include hexamethylolmelamine.

Examples of the aziridine derivative include trade name HDU, trade name TAZM, and trade name TAZO (all manufactured by Sogo Pharmaceutical Co., Ltd.) as a commercially available product. These compounds may be used alone, or may be used by mixing two or more kinds.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, fluidlity is reduced, and wetting on an adherend becomes insufficient, and there is a tendency that this becomes cause for peeling off.

Alternatively, a polyfunctional monomer containing two or more radiation-reactive unsaturated bonds as a substantial crosslinking agent is added, and this may be crosslinked with radiation.

As the polyfunctional monomer having two or more radiation-reactive unsaturated bonds, a polyfunctional monomer component having two or more of one kind or two or more kinds radiation-reactive groups which can be crosslinking-treated (cured) by irradiation of radiation, such as a vinyl group, an acryloyl group, a methacryloyl group, and a vinylbenzyl group is used. Generally, a component having 10 or less of radiation-reactive unsaturated bonds is suitably used. Two or more kinds of the polyfunctional monomer may be used by mixing.

Examples of the polyfinctnal monomer include ethylene glycol di(meth)acrylate, diethlene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of the polyfunctinoal monomer to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the monomer is preferably blended at 0.1 to 30 parts by weight relative to 100 parts by weight of a (meth)acryl-based polymer. From a viewpoint of flexibility and tackiness, the monomer is preferably blended at 10 parts by weight or less relative to 100 parts by weight of a (meth)acryl-based polymer.

Examples of radiation include ultraviolet ray, laser ray, α ray, β ray, γ ray, X-ray, and electron beam. From a viewpoint of controlling property and better handling property and a cost, ultraviolet ray is suitably used. More preferably, ultraviolet ray having a wavelength of 200 to 400 nm is used. Ultraviolet ray can be irradiated using an appropriate light source such as a high pressure mercury lamp, a micro-wave excitation-type lamp, and a chemical lamp. When ultraviolet ray is used as irradiation, a photopolymerization initiator is added to an acryl pressure-sensitive adhesive layer.

The photopolymerization initiator depends on a kind of a radiation-reactive component, and may be a substance which produces a radical or a cation by irradiating ultraviolet ray having an appropriately wavelength which can trigger the polymerization reaction.

Example of the photoradical polymerization initiator include benzoins such as benzoin, benzoin methyl ether, benzoin ethyl ether, methyl o-benzoylbenzoate-p-benzoin ethyl ether, benzoin isopropyl ether, and α-methylbenzoin, acetophenones such as benzylmethylketal, trichloroacetophenone, 2,2-diethoxyacetophenone, and 1-hydroxycyclohexyl phenyl ketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p-dimethylaminobenzophenone, thioxanthons such as 2-chlorothioxanthon, 2-ethylthioxanthon, and 2-isopropylthioxanthon, acylphosphine oxides such as bis(2,4,6-trimethylbenzoyl)-phenylphosphine oxide, 2,4,6-trimethylbenzoyldiphenylphosphine oxide, and (2,4,6-trimethylbenzoyl)-(ethoxy)-phenylphosphine oxide, benzil, dibenzsuberone, and α-acyloxime ether.

Examples of a photocation polymerization initiator include onium salts such as an aromatic diazonium salt, an aromatic iodonium salt, and an aromatic sulfonium salt, organometallic complexes such as an ion-allene complex. a titanocene complex, and an aryl silanol-aluminum complex, nitrobenzyl ester, sulfonic acid derivative, phosphoric acid ester, phenolsulfonic acid ester, diazonaphthoquinone, and N-hydroxymidosulfonate. Two or more kinds of the photopolymerization initiators may be used by mixing.

It is preferably that the photopolymerization initiator is blended usually in a range of 0.1 to 10 parts by weight, preferably 0.2 to 7 parts by weight relative to 100 parts by weight of a (meth)acryl-based polymer.

Further, it is also possible to use a photoinitiation polymerization assistant such as amines. Examples of the photoinitiation assistant include 2-dimethylaminoethyl benzoate, diemethylaminoacetophenone, p-dimethylaminobenzoic acid ethyl ester, and p-dimethylaminobenzoic acid isoamyl ester. Two or more kinds of the photopolymerization initiation assistants may be used. It is preferably that the polymerization initiation assistant is blended at 0.05 to 10 parts by weight, further 0.1 to 7 parts by weight relative to 100 parts by weight a (meth)acryl-based polymer.

Further, the previously known tackifiers, or the previously known various additives such as a leveling agent, an antioxidant, a corrosion preventing agent, a photo stabilizer, an ultraviolet absorbing agent, a polymerization inhibitor, a silane coupling agent, and a powder, a particle, and a foil of inorganic or organic filer, metal powder and pigment may be appropriately added to the pressure-sensitive adhesive composition used in the pressure-sensitive adhesive sheet of the present invention depending on utility.

A pressure-sensitive adhesiive composition of the present invention can suitably contain an ether group-containing compound. The pressure-sensitive adhesive composition may become a pressure-sensitive adhesive composition further excellent in antistatic property by containing the above-mentioned ether group-containing compound. Although it is not clear that the reason why the antistatic property is improved by the use of an ether group-containing compound, through using together an ether group-containing compound improves the wettability to nonpolar materials such as a fluoro resin and the transfer of an ionic liquid to an adherend can be carried out effectively.

The ether group-containing compounds in the present invention are not particularly limited as long as they contain an ether group, and well-known an ether group-containing compounds can be used.

As the above-mentioned ether group-containing compounds, in specific terms, for example, polyether polyol compounds, compounds containing an alkylene oxide group, and the like can be listed. Among them, polyether polyol compounds, (meth)acryl-based polymers containing an alkylene glycol group, and ether type surfactants such as polyoxyalkylene alkylphenyl ethers, polyoxyalkylene alkyl ethers, and polyoxyalkylene alkylallyl ethers are preferably used because they are easily well-balanced in compatibility with the base polymer.

Polyether polyol compounds include, for example, polyethylene glycol, polypropylene glycol (a diol type), polypropylene glycol (a triol type), polytetramethylene ether glycol, derivatives of the above-mentioned compounds, and random copolymers and block copolymers of polyethylene glycol and polypropylene glycol such as block copolymers of polypropylene glycol-polyethylene glycol-polypropylene glycol, block copolymers of polypropylene glycol-polyethylene glycol, block copolymers of polyethylene glycol-polypropylene glycol-polyethylene glycol, and random copolymers of polypropylene glycol-polyethylene glycol.

Further, the terminal of the glycol chain may be the hydroxyl group as it is, or may be substituted with an alkyl group, a phenyl group, and the like.

As (meth)acryl-based polymers containing an alkylene glycol group, (meth)acryl-based polymers, the essential component of which is a (meth)acrylate containing an alkylene glycol group, are used.

As oxyalkylene units to the above-mentioned (meth)acrylates, those having an alkylene group of 1 to 6 in carbon number, for example, oxymethylene groups, oxyethylene groups, oxypropylene groups, oxybutylene groups and the like can be listed.

Moreover, the number of moles added of an oxyalkylene unit to (meth)acrylates is preferable to be 1 to 50 and more preferable to be 2 to 30, from the viewpoint of the coordination of an ionic liquid.

Further, the terminal of the oxyalkylene chain may be the hydroxyl group as it is, or may be substituted with an alkyl group, a phenyl group, and the like.

(Meth)acrylates containing an alkylene glycol group include, for example, methoxy-polyethylene glycol (meth)acrylate types such as methoxy-diethylene glycol (meth)acrylates and methoxy-triethylene glycol (meth)acrylates, ethoxy-polyethylene glycol (meth)acrylate types such as ethoxydiethylene glycol (meth)acrylates and ethoxy-triethylene glycol (meth)acrylates, butoxy-polyethylene glycol (meth)acrylate types such as butoxy-diethylene glycol (meth)acrylates and butoxy-triethylene glycol (meth)acrylates, phenoxy-polyethylene glycol (meth)acrylate types such as phenoxy-diethylene glycol (meth)acrylates and phenoxy-triethylene glycol (meth)acrylates, methoxy-polypropylene glycol (meth)acrylate types such as methoxy-dipropylene glycol (meth)acrylates, 2-ethylhexyl-polyethylene glycol (meth)acrylates, and nonylphenyl-polyethylene glycol (meth)acrylates.

Moreover, besides the above-mentioned components, the following (meth)acrylates having an alkyl group of 1 to 14 in carbon number can also be used: methyl (meth)acrylates, ethyl (meth)acrylates, n-butyl (meth)acrylates, s-butyl (meth)acrylates, t-butyl (meth)acrylates, isobutyl (meth)acrylates, hexyl (meth)acrylates, 2-ethylhexyl (meth)acrylates, n-octyl (meth)acrylates, iso-octyl (meth)acrylates, n-nonyl (meth)acrylates, iso-nonyl (meth)acrylates, n-decyl (meth)acrylates, iso-decyl (meth)acrylates, n-dodecyl (meth)acrylates, n-tridecyl (meth)acrylates, and n-tetradecyl (meth)acrylates.

Furthermore, it is also possible to suitably use such compounds as (meth)acrylates containing a phosphate group, (meth)acrylates containing a cyano group, vinyl esters, aromatic vinyl compounds, (meth)acrylates containing an acid anhydride group, (meth)acrylates containing a hydroxyl group, (meth)acrylates containing an amide group, (meth)acrylates containing an amino group, (meth)acrylates containing an imide group, (meth)acrylates containing an epoxy group, N-acryloyl morpholine, and vinyl ethers.

Examples of the phosphoric acid group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutylvinyl ether, and diethylene glycol monovinyl ether.

Examples of the amido group-containing monomer include acrylamide, methacrylamide, diethylacrylamide, N-vinylpyrrolidone, N,N-dimethylacrylamide, N, N-dimethylmethacrylamide, N,N-diethylacrylamide, N,N-diethylmethacrylamide, N, N'-methylenebisacrylamide, N,N-dimethylaminopropylacrylamide, N, N-dimethylaminopropylmethacrylamide, and diacetoneacrylamide.

Examples of the amino group-containing monomer include aminoethyl (meth)acrylate, N,N-dimethylaminoethyl (meth)acrylate, N,N-dimethylaminopropyl (meth)acrylate, and (meth)acryloylmorpholine.

Examples of the imido group-containing monomer include cyclohexylmaleimide, isopropylmaleimide, N-cyclohexylmaleimide, and itaconeimide.

Examples of the epoxy group-containing monomer include glycidyl (meth)acrylate, methylglycidyl (meth)acrylate, and allyl glycidyl ether.

Examples of vinyl ethers include methyl vinyl ether, ethyl vinyl ether, and isobutyl vinyl ether.

The aforementioned (meth)acrylates may be used alone, or two or more kinds may be used by mixing, and a content as a whole is such that a (meth)acrylate containing an alkylene glycol group is preferably 10 to 70 parts by weight of a total constituting unit of a (meth)acryl-based polymer containing an alkylene glycol group. When the content of the (meth)acrylate containing an alkylene glycol group is less than 10% by weight, it is not preferable because the compatibility with the ionic liquid deteriorates and the electrification property cannot be obtained sufficiently. On the other hand, when the content of the (meth)acrylate containing an alkylene glycol group is over 70% by weight, it is not preferable because the compatibility with the (meth)acryl-based polymer deteriorates and the electrification property cannot be obtained sufficiently.

Ether type surfactants include, for example, nonionic surfactants such as polyoxyalkylene fatty acid esters, polyoxyalkylene sorbitan fatty acid esters, polyoxyalkylene sorbitol fatty acid esters, polyoxyalkylene alkyl ethers, polyoxyalkylene alkylallyl ethers, polyoxyalkylene alkylphenyl ethers, polyoxyalkylene derivatives, polyoxyalkylene alkylamines, and polyoxyalkylene alkylamine fatty acid esters, anionic surfactants such as polyoxyalkylene alkylether sulfate esters, polyoxyalkylene alkylether phosphate esters, polyoxyalkylene alkylphenylether sulphate esters, and polyoxyalkylene alkylphenylether phosphate esters, cationic surfactants having an alkylene oxide group, and amphoteric surfactants. These ether type surfactants may have a reactive substituent such as an (meth)acryloyl group and an allyl group in the molecule.

Among the above-mentioned ether type surfactants, the following surfactants are preferably used: nonionic surfactants having an ethylene oxide group such as polyoxyethylene fatty acid esters, polyoxyethylene sorbitan fatty acid esters, polyoxyethylene sorbitol fatty acid esters, polyoxyethylene alkyl ethers, polyoxyethylene alkylallyl ethers, polyoxyethylene alkylphenyl ethers, polyoxyethylene derivatives, polyoxyethylene alkylamines, and polyoxyethylene alkylamine fatty acid esters, anionic surfactants having an ethylene oxide group such as polyoxyethylene alkylether sulfate esters, polyoxyethylene alkylether phosphate esters, polyoxyethylene alkylphenylether sulphate esters, and polyoxyethylene alkylphenylether phosphate esters, cationic surfactants having an ethylene oxide group, and amphoteric surfactants. These ether type surfactants may have a reactive substituent such as an (meth)acryloyl group and an allyl group in the molecule.

The number of moles added of the oxyalkylene unit in the surfactants having the above-mentioned alkylene oxide groups is preferable to be 1 to 50 and more preferable to be 2 to 40, from the viewpoint of the interaction with the ionic liquid. When the number of moles added of the oxyalkylene unit is less than 1, it is not preferable because the oxyalkylene unit is hard to be balanced in compatibility with the ionic liquid and the base polymer and the bleeding to the adherend is apt to increase. On the other hand, when the number of moles added of the oxyalkylene unit is more than 50, it is also not preferable because the ionic liquid is restrained by the alkylene oxide group and the antistatic property is apt to be decreased.

Specific examples of ether type surfactants include, for example, ADEKA REASOAP NE-10, ADEKA REASOAP SE-ION, ADEKA REASOAP SE-20N, ADEKA REASOAP ER-10, ADEKA REASOAP SR-10, and ADEKA REASOAP SR-20 (all mentioned above are manufactured by Asahi Denka Co., Ltd.), Emulgen 120 (manufactured by Kao Corp.), and Noigen EA130T (manufactured by Dai-ichi Kogyo Seiyaku Co., Ltd.).

As for the molecular weight of the above-mentioned ether group-containing compound s of 10,000 or less in number average molecular weight are suitably used and those of 200 to 5000 are more suitably used. Compounds of more than 10,000 in number average molecular weight are apt to worsen their staining property to the adherend.

Although the above-mentioned ether group-containing compounds may be used separately and may be used in the mixture of two or more kinds, the blending quantity is preferable to be 0.01 to 10 weight parts to 100 weight parts of the base polymer, and more preferable to be 0.05 to 5 weight parts. When the blending quantity is less than 0.01 weight parts, sufficient electrification property cannot be obtained, and when the quantity is more than 10 weight parts, the bleeding to the adherend is increased to tend to lower the adhesive strength.

Meanwhile, the pressure-sensitive adhesive layer in the present invention is such that the aforementioned pressure-sensitive adhesive composition is crosslinked. In addition, pressure-sensitive adhesive sheets of the present invention are such that such the pressure-sensitive adhesive layer is formed on a supporting film. Thereupon, crosssslinking of the pressure-sensitive adhesive composition is generally performed after coating of the pressure-sensitive adhesive composition, and a pressure-sensitive adhesive layer composition after crosslinking may be also transferred onto a supporting film.

When a photopolymerization initiator as an arbitrary component is added as described above, a pressure-sensitive adhesive layer can be obtained by coating the pressure-sensitive adhesive composition directly on a subject to be protected, or coating on one side or both sides of a supporting substrate, and performing light irradiation. Usually, a pressure-sensitive adhesive layer is used by photopolymerization by irradiating with ultraviolet ray having an irradiance of 1 to 200 mW/cm$^2$ at a wavelength of 300 to 400 nm, at an expose dose of around 200 to 4000 mJ/cm$^2$.

A method of forming a pressure-sensitive adhesive layer on a film is not particularly limited, but for example, a layer is prepared by coating the aforementioned pressure-sensitive adhesive composition on a supporting film, and drying this to remove a polymerization solvent to form a pressure-sensitive adhesive layer on a supporting film. Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape. In particular, it is preferable to use a plastic substrate as a support in a case of a surface protecting film.

The plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

A thickness of the film is usually 5 to 200 μm, preferably around 10 to 100 μm.

The plastic substrate may be subjected to releasing, antistaining or acid treatment with silicone, fluorine, long chain alkyl-based or fatty acid amide-based releasing agent, or a silica powder, easy adhesion treatment such as alkali treatment, primer treatment, corona treatment, plasma treatment, and ultraviolet ray treatment, or coating-type, kneading-type, or deposition-type antistatic treatment, if necessary.

In addition, it is more preferably that a plastic substrate used in the surface protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used.

Examples of a method of providing an electrification preventing layer on at least one side of a film include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammmonium salt, acyloylamidopropyltrimethtylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl) alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol (meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melamine and epoxy is used. In the case of a polymer-type electrification preventing agent, it is not necessary that a resin component is contained. In addition, the electrification preventing resin component may contain compounds of a methylolated or alkylolated melanine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 μm, preferably around 0.03 to 1 μm.

Examples of a method of depositing or plating an electrically conductive substance include vacuum deposition, sputtering, ion plating, chemical deposition, spray pyrolysis, chemical plating, and electric plating methods.

A thickness of the electrically conductive substance is usually 20 to 10000 Å, preferably 50 to 5000 Å.

As the kneading-type electrification preventing agent, the aforementioned electrification preventing agent is appropriately used.

An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

The plastic film may be subjected to releasing, anti-staining or acid treatment with a silicone-based, fluorine-based, long chain alkyl-based or fatty acid amide-based releasing agent, or a silica powder, or easy adhesion treatment such as alkali treatment, primer treatment, corona treatment, plasma treatment, and ultraviolet treatment, if necessary.

If necessary, a separator (or peeling liner, peeling sheet etc.) can be laminated on a surface of a pressure-sensitive adhesive for the purpose of protecting a pressure-sensitive adhesive surface. As a substrate constituting a separator, there are a paper and a plastic film, and a plastic film is suitably used from a viewpoint of excellent surface smoothness.

The film is not particularly limited as far as it is a film which can protect the pressure-sensitive adhesive layer, and examples include a polyolefin film such as polyethylene, polypropylene, poly-1-butene, poly-4-methyl-1-pentene, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyether film such as polyethylene terephthalate, polyethylene naphthalate, and polybutylene terephthalate, a polyacrylate film, a polystyrene film, a polyamide film such as nylon 6, nylon 6,6, and partially aromatic polyamide, a polyvinyl chloride film, a poly vinylidene chloride film, and a polycarbonate film.

A thickness of the film is usually around 5 to 200 μm, preferably around 10 to 100 μm. A pressure-sensitive adhesive layer applying surface of the film is appropriately subjected to treatment with a releasing agent such as a silicone-based, fluorine-based, long chain alkyl-based, or fatty acid amide-based releasing agent, or a silica powder.

The pressure-sensitive adhesive composition, the pressure-sensitive adhesive layer and the pressure-sensitive adhesive sheets using the present invention are used, particularly, in plastic products on which static electricity is easily generated and, in particular, can be used as a surface protecting film used for the purpose of protecting an optical member surface such as a polarizing plate, a wavelength plate, an optical compensating film, a light diffusion sheet and a reflecting sheet which are used in a liquid crystal display.

EXAMPLES

Examples which specifically show a construction and effect of the present invention will be explained below. Assessment items in Examples were measured as follows:
<Measurement of Acid Value>
An acid value was measured using an automatically titrating apparatus (COM-550 manufactured by HIRANUMA SANGYO Co., Ltd.), and was obtained by the following equation.

$$A=\{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)
Measurement conditions are as follows:
Sample solution: About 0.5 g of a polymer sample was dissolved in 50 g of a mixed solvent (toluene/2-propanol/distilled water=50/49.5/0.5, weight ratio) to obtain a sample solution.
Titration solution: 0.1N 2-propanolic potassium hydroxide solution (for petroleum product neutralization value test manufactured by Wako Pure Chemical Industries, Ltd.)
Electrode: glass electrode; GE-101, comparative electrode; RE-201, Measurement mode: petroleum product neutralization value test 1
<Measurement of Molecular Weight>
A molecular weight was measured using a GPC apparatus (HLC-8220GPC manufactured by Tosoh Corporation). Measuring conditions are as follows.
Sample concentration: 0.2 wt % (THF solution)
Sample injection amount: 10 μl
Eluent: THF
Flow rate: 0.6 ml/min
Measuring temperature: 40° C.
Column:
Sample column;
TSKguard column SuperHZ-H(1 column)+TSK gel Super HZM-H(2 columns)
Reference column;
TSK gel SuperH-RC(1 column)
Detector: Refractive index detector (RI)
A molecular weight was obtained in terms of polystyrene.
<Measurement of Glass Transition Temperature Tg>
A glass transition temperature Tg(° C.) of Acryl-based polymers was obtained by the following procedures using the measurement of a dynamic viscoelasticity.
Sheets of an acryl-based polymer having a thickness of 25 μm were laminated into a thickness of about 2 mm, this was punched into 47.9 mm to prepare a cylindrical pellet, and this was used as a sample for measuring a glass transition temperature (Tg).
Using the measuring sample, the measuring sample was fixed on a jig of a φ7.9 mm parallel plate, temperature dependency of loss elastic modulus G" was measured with a dynamic viscoelasticity measuring apparatus (ARES manufactured by Rheometric Scientific, Inc.), and a temperature at which the resulting G" curve became a maximum was adopted as a glass transition temperature (Tg) (° C.). Measuring conditions are as follows.
Measurement: shear mode
Temperature range: −70° C. to 200° C.
Temperature raising rate: 5° C./min
Frequency: 1 Hz
[Preparation of (Meth)Acryl-based Polymers]
(Acryl-based Polymer (A))
In a four-neck flask equipped with a stirring blade, a thermometer, a nitrogen gas introduction pipe, a condenser, and a dropping funnel, 198 weight parts of 2-ethylhexyl acrylate, 2 weight parts of a reactive surfactant (Latemul PD-420 manufactured by Kao Corp.), 8 weight parts of 2-hydroxyethyl acrylate, 0.4 weight parts of 2,2'-azobisisobutyronitrile as a polymerization initiator, and 386 weight parts of ethyl acetate were put in. Then, nitrogen gas was introduced into the flask while slowly stirring the mixture and the polymerization reaction was carried out for 6 hours while keeping the liquid temperature in the flask at about 65° C., and an acryl-based polymer (A) solution (35% by weight) was thus prepared. As for this acryl-based polymer (A), Tg was −10° C. or less, the weight average molecular weight was 450,000, and the acid value was 0.0.
(Acryl-based Polymer (B))
In a four-neck flask equipped with a stirring blade, a thermometer, a nitrogen gas introduction pipe, a condenser, and a dropping funnel, 198 weight parts of 2-ethylhexyl acrylate, 2 weight parts of a reactive surfactant (ADEKA REASOAP ER-10 manufactured by Asahi Denka Co., Ltd.), 8 weight parts of 2-hydroxyethyl acrylate, 0.4 weight parts of 2,2'-azobisisobutyronitrile as a polymerization initiator, and 386 weight parts of ethyl acetate were put in. Then, nitrogen gas was introduced into the flask while slowly stirring the mixture and the polymerization reaction was carried out for 6 hours while keeping the liquid temperature in the flask at about 65° C., and an acryl-based polymer (B) solution (35% by weight) was thus prepared. As for this acryl-based polymer (B), Tg was −10° C. or less, the weight average molecular weight was 440,000, and the acid value was 0.0.
(Acryl-based Polymer (C))
In a four-neck flask equipped with a stirring blade, a thermometer, a nitrogen gas introduction pipe, a condenser, and a dropping funnel, 200 weight parts of 2-ethylhexyl acrylate, 8 weight parts of 2-hydroxyethyl acrylate, 0.4 weight parts of 2,2'-azobisisobutyronitrile as a polymerization initiator, and 312 weight parts of ethyl acetate were put in. Then, nitrogen gas was introduced into the flask while slowly stirring the mixture and the polymerization reaction was carried out for 6 hours while keeping the liquid temperature in the flask at about 65° C., and an acryl-based polymer (C) solution (40% by weight) was thus prepared. As for this acryl-based polymer (C), Tg was −10° C. or less, the weight average molecular weight was 550,000, and the acid value was 0.0.

(Acryl-based Polymer (D))

In a four-neck flask equipped with a stirring blade, a thermometer, a nitrogen gas introduction pipe, a condenser, and a dropping funnel, 199 weight parts of 2-ethylhexyl acrylate, 1 weight part of a reactive surfactant (Latemul PD-420 manufactured by Kao Corp.), 8 weight parts of 2-hydroxyethyl acrylate, 0.4 weight parts of 2,2'-azobisisobutyronitrile as a polymerization initiator, and 386 weight parts of ethyl acetate were put in. Then, nitrogen gas was introduced into the flask while slowly stirring the mixture and the polymerization reaction was carried out for 6 hours while keeping the liquid temperature in the flask at about 65° C., and an acryl-based polymer (D) solution (35% by weight) was thus prepared. As for this acryl-based polymer (D), Tg was −10° C. or less, the weight average molecular weight was 410,000, and the acid value was 0.0.

(Acryl-based Polymer (E))

In a four-neck flask equipped with a stirring blade, a thermometer, a nitrogen gas introduction pipe, a condenser, and a dropping funnel, 199 weight parts of 2-ethylhexyl acrylate, 1 weight part of a reactive surfactant (ADEKA REASOAP NE-10 manufactured by Asahi Denka Co., Ltd.), 8 weight parts of 2-hydroxyethyl acrylate, 0.4 weight parts of 2,2'-azobisisobutyronitrile as a polymerization initiator, and 386 weight parts of ethyl acetate were put in. Then, nitrogen gas was introduced into the flask while slowly stirring the mixture and the polymerization reaction was carried out for 6 hours while keeping the liquid temperature in the flask at about 65° C., and an acryl-based polymer (E) solution (35% by weight) was thus prepared. As for this acryl-based polymer (E), Tg was −10° C. or less, the weight average molecular weight was 450,000, and the acid value was 0.0.

(Acryl-based Polymer (F))

In a four-neck flask equipped with a stirring blade, a thermometer, a nitrogen gas introduction pipe, a condenser, and a dropping funnel, 199.6 weight parts of 2-ethylhexyl acrylate, 0.4 weight parts of a reactive surfactant (Latemul PD-420 manufactured by Kao Corp.), 8 weight parts of 2-hydroxyethyl acrylate, 0.4 weight parts of 2,2'-azobisisobutyronitrile as a polymerization initiator, and 386 weight parts of ethyl acetate were put in. Then, nitrogen gas was introduced into the flask while slowly stirring the mixture and the polymerization reaction was carried out for 6 hours while keeping the liquid temperature in the flask at about 65° C., and an acryl-based polymer (F) solution (35% by weight) was thus prepared. As for this acryl-based polymer (F), Tg was −10° C. or less, the weight average molecular weight was 450,000, and the acid value was 0.0.

(Acryl-based Polymer (G))

In a four-neck flask equipped with a stirring blade, a thermometer, a nitrogen gas introduction pipe, a condenser, and a dropping funnel, 199.4 weight parts of 2-ethylhexyl acrylate, 0.6 weight parts of a reactive surfactant (Latemul PD-430 manufactured by Kao Corp.), 8 weight parts of 2-hydroxyethyl acrylate, 0.4 weight parts of 2,2'-azobisisobutyronitrile as a polymerization initiator, and 386 weight parts of ethyl acetate were put in. Then, nitrogen gas was introduced into the flask while slowly stirring the mixture and the polymerization reaction was carried out for 6 hours while keeping the liquid temperature in the flask at about 61° C., and an acryl-based polymer (G) solution (35% by weight) was thus prepared. As for this acryl-based polymer (G), Tg was −10° C. or less, the weight average molecular weight was 510,000, and the acid value was 0.0.

<Preparation of Antistatic Agent Solution>

(Antistatic Agent Solution (a))

Ten weight parts of lauryltrimethylammonium chloride (in solid form at 25° C. or less, manufactured by Tokyo Kasei Kogyo Co., Ltd.), which is a cationic surfactant, was diluted with 20 weight parts of ethyl acetate and 20 weight parts of isopropyl alcohol to prepare an antistatic agent solution (a) (20% by weight).

<Manufacture of an Antistatic-treated Film>

Ten weight parts of an antistatic agent (Microsolver RMd-142 manufactured by Solvex Corp., which contains tin oxide and a polyester resin as main components) was diluted with a mixed solvent comprised of 30 weight parts of water and 70 weight parts of methanol to prepare an antistatic agent solution.

The obtained antistatic agent solution was applied on a polyethylene terephthalate (PET) film (38 μm in thickness) with Mayer bar and then dried at 130° C. for one minute to remove the solvent, resulting in forming an antistatic layer (0.2 μm in thickness). Thus, an antistatic-treated film was manufactured.

Example 1

(Preparation of a Pressure-sensitive Adhesive Composition)

The above-mentioned acryl-based polymer (A) solution (35% by weight) was diluted with ethyl acetate to 20% by weight. In 100 weight parts of this solution, 0.14 weight parts of an aliphatic amine-based ionic liquid (IL-A1 in a liquid state at 25° C., manufactured by Koei Chemical Co., Ltd.), 0.4 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (1).

(Manufacture of a Pressure-sensitive Adhesive Sheet)

The above-mentioned acrylic pressure-sensitive adhesive solution (1) was applied on the surface opposite to the antistatic-treated surface of the above-mentioned antistatic-treated film and heated at 110° C. for 3 minutes to form a pressure-sensitive adhesive layer of 20 μm in thickness. Then, the silicone-treated surface of a polyethylene terephthalate film that was 25 μm in thickness and silicone treatment had been performed on one side was stuck to the surface of the above-mentioned pressure-sensitive adhesive layer to manufacture a pressure-sensitive adhesive sheet.

Example 2

(Preparation of a Pressure-sensitive Adhesive Composition)

An acrylic pressure-sensitive adhesive solution (2) was prepared in the same method as Example 1, except that 0.12 weight parts of 1-butyl-3-methylpyridinium bis(trifluoromethanesulfonyl) imide (BMP-IL in a liquid state at 25° C., manufactured by Japan Carlit Co., Ltd.) was used in place of 0.14 weight parts of the above-mentioned aliphatic amine-based ionic liquid (IL-A1 in a liquid state at 25° C., manufactured by Koei Chemical Co., Ltd.).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (2) in place of the above-mentioned acrylic pressure-sensitive adhesive solution (1).

Example 3

(Preparation of a Pressure-sensitive Adhesive Composition)

The above-mentioned acryl-based polymer (D) solution (35% by weight) was diluted with ethyl acetate to 20% by weight. In 100 weight parts of this solution, 0.1 weight parts of an aliphatic anine-based ionic liquid (IL-A1 in a liquid state at 25° C., manufactured by Koei Chemical Co., Ltd.), 0.4 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (3).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (3) in place of the above-mentioned acrylic pressure-sensitive adhesive solution (1).

Example 4

(Preparation of a Pressure-sensitive Adhesive Composition)

An acrylic pressure-sensitive adhesive solution (4) was prepared in the same method as Example 3, except that 0.08 weight parts of 1-butyl-3-methylpyridinium bis(trifluoromethanesulfonyl) imide (BMP-IL in a liquid state at 25° C., manufactured by Japan Carlit Co., Ltd.) was used in place of 0.1 weight parts of the above-mentioned aliphatic amine-based ionic liquid (IL-A1 in a liquid state at 25° C., manufactured by Koei Chemical Co., Ltd.).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (4) in place of the above-mentioned acrylic pressure-sensitive adhesive solution (1).

Comparative Example 1

(Preparation of a Pressure-sensitive Adhesive Composition)

An acrylic pressure-sensitive adhesive solution (5) was prepared in the same method as Example 1, except for using the above-mentioned (meth)acryl-based polymer (B) (35% by weight) in place of the above-mentioned (meth)acryl-based polymer (A) (35% by weight).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (5) in place of the above-mentioned acrylic pressure-sensitive adhesive solution (1).

Comparative Example 2

(Preparation of a Pressure-sensitive Adhesive Composition)

An acrylic pressure-sensitive adhesive solution (6) was prepared in the same method as Example 1, except that the above-mentioned aliphatic amine-based ionic liquid was not used.

(Manufacture of a Pressure-sensitive Adhesive Sheet)

A pressure-sensitive adhesive sheet was manufactured in the same method as Example 1, except for using the above-mentioned acrylic pressure-sensitive adhesive solution (6) in place of the above-mentioned acrylic pressure-sensitive adhesive solution (1).

Comparative Example 3

(Preparation of a Pressure-sensitive Adhesive Composition)

The above-mentioned acryl-based polymer (C) solution (40% by weight) was diluted with ethyl acetate to 20% by weight. In 100 weight parts of this solution, 1.0 weight part of the above-mentioned antistatic agent solution (a) (20% by weight), 0.4 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (7).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (7) in place of the above-mentioned acrylic pressure-sensitive adhesive solution (1).

Comparative Example 4

(Preparation of a Pressure-sensitive Adhesive Composition)

An acrylic pressure-sensitive adhesive solution (8) was prepared in the same method as Comparative example 1, except that 0.12 weight parts of 1-butyl-3-methylpyridinium bis(trifluoromethanesulfonyl) imide (BMP-IL in a liquid state at 25° C., manufactured by Japan Carlit Co., Ltd.) was used in place of 0.14 weight parts of the above-mentioned aliphatic amine-based ionic liquid (IL-A1 in a liquid state at 25° C., manufactured by Koei Chemical Co., Ltd.).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (8) in place of the above-mentioned acrylic pressure-sensitive adhesive solution (1).

Comparative Example 5

(Preparation of a Pressure-sensitive Adhesive Composition)

The above-mentioned acryl-based polymer (E) solution (35% by weight) was diluted with ethyl acetate to 20% by weight. In 100 weight parts of this solution, 0.1 weight parts of an aliphatic amine-based ionic liquid (IL-A1 in a liquid state at 25° C., manufactured by Koei Chemical Co., Ltd.), 0.4 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (9).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (9) in place of the above-mentioned acrylic pressure-sensitive adhesive solution (1).

Comparative Example 6

(Preparation of a Pressure-sensitive Adhesive Composition)

An acrylic pressure-sensitive adhesive solution (10) was prepared in the same method as Example 3, except that the above-mentioned aliphatic amine-based ionic liquid was not used.

(Manufacture of a Pressure-sensitive Adhesive Sheet)

A pressure-sensitive adhesive sheet was manufactured in the same method as Example 1, except for using the above-mentioned acrylic pressure-sensitive adhesive solution (10) in place of the above-mentioned acrylic pressure-sensitive adhesive solution (1).

Comparative Example 7

(Preparation of a Pressure-sensitive Adhesive Composition)

An acrylic pressure-sensitive adhesive solution (11) was prepared in the same method as Comparative example 5, except that 0.08 weight parts of 1-butyl-3-methylpyridinium bis(trifluoromethanesulfonyl) imide (BMP-IL in a liquid state at 25° C., manufactured by Japan Carlit Co., Ltd.) was used in place of 0.1 weight parts of the above-mentioned aliphatic amine-based ionic liquid (IL-A1 in a liquid state at 25° C., manufactured by Koei Chemical Co., Ltd.).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (11) in place of the above-mentioned acrylic pressure-sensitive adhesive solution (1).

Example 5

(Preparation of a Pressure-sensitive Adhesive Composition)

An acrylic pressure-sensitive adhesive solution (12) was prepared in the same method as Example 4, except that 0.2 weight parts of 1-butyl-3-methylpyridinium bis(trifluoromethanesulfonyl) imide (BMP-IL in a liquid state at 25° C., manufactured by Japan Carlit Co., Ltd.) was used in place of 0.08 weight parts of the above-mentioned 1-butyl-3-methylpyridinium bis(trifluoromethanesulfonyl) imide (BMP-IL in a liquid state at 25° C., manufactured by Japan Carlit Co., Ltd.).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (12) in place of the above-mentioned acrylic pressure-sensitive adhesive solution (1).

Example 6

(Preparation of a Pressure-sensitive Adhesive Composition)

The above-mentioned acryl-based polymer (D) solution (35% by weight) was diluted with ethyl acetate to 20% by weight. In 100 weight parts of this solution, 0.18 weight parts of 1-butyl-3-methylpyridinium bis(trifluoromethanesulfonyl) imide (BMP-IL in a liquid state at 25° C., manufactured by Japan Carlit Co., Ltd.), 0.03 weight parts of methoxy polyethylene glycol monomethacrylate (Blemmer PME-400 manufactured by NOF Corporation), 0.7 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (13).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (13) in place of the above-mentioned acrylic pressure-sensitive adhesive solution (1).

Example 7

(Preparation of a Pressure-sensitive Adhesive Composition)

The above-mentioned acryl-based polymer (D) solution (35% by weight) was diluted with ethyl acetate to 20% by weight. In 100 weight parts of this solution, 0.18 weight parts of 1-butyl-3-methylpyridinium bis(trifluoromethanesulfonyl) imide (BMP-IL in a liquid state at 25° C., manufactured by Japan Carlit Co., Ltd.), 0.03 weight parts of methoxy polyethylene glycol monomethacrylate (Blemmer PME-1000 manufactured by NOF Corporation), 0.7 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (14).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (14) in place of the above-mentioned acrylic pressure-sensitive adhesive solution (1).

Example 8

(Preparation of a Pressure-sensitive Adhesive Composition)

The above-mentioned acryl-based polymer (F) solution (35% by weight) was diluted with ethyl acetate to 20% by weight. In 100 weight parts of this solution, 0.11 weight parts of 1-butyl-3-methylpyridinium bis(trifluoromethanesulfonyl) imide (BMP-IL in a liquid state at 25° C., manufactured by Japan Carlit Co., Ltd.), 0.48 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (15).

(Manufacture of a Pressure-sensitive Adhesive Sheet)

A pressure-sensitive adhesive sheet was manufactured in the same method as Example 1, except for using the above-mentioned acrylic pressure-sensitive adhesive solution (15) in place of the above-mentioned acrylic pressure-sensitive adhesive solution (1).

Example 9

(Preparation of a Pressure-sensitive Adhesive Composition)

The above-mentioned acryl-based polymer (G) solution (35% by weight) was diluted with ethyl acetate to 20% by weight. In 100 weight parts of this solution, 0.08 weight parts of 1-butyl-3-methylpyridinium bis(trifluoromethanesulfonyl) imide (BMP-IL in a liquid state at 25° C., manufactured by Japan Carlit Co., Ltd.), 0.4 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (16).
(Manufacture of a Pressure-sensitive Adhesive Sheet)
A pressure-sensitive adhesive sheet was manufactured in the same method as Example 1, except for using the above-mentioned acrylic pressure-sensitive adhesive solution (16) in place of the above-mentioned acrylic pressure-sensitive adhesive solution (1).

Example 10

(Preparation of a Pressure-sensitive Adhesive Composition)
The above-mentioned acryl-based polymer (D) solution (35% by weight) was diluted with ethyl acetate to 20% by weight. In 100 weight parts of this solution, 0.18 weight parts of 1-butyl-2,3,5-trimethylpyrazolium bis(trifluoromethanesulfonyl) imide (ILC-404-2 in a liquid state at 25° C., manufactured by Japan Carlit Co., Ltd.), 0.7 weight parts of an isocyanurate of hexamethylene diisocyanate (Coronate HX manufactured by Nippon Polyurethane Industry Co., Ltd.), and 0.4 weight parts of dibutyl tin dilaurate (1% by weight ethyl acetate solution) as a crosslinking catalyst were added and then, the mixture was mixed and stirred at 25° C. or less for about one minute to prepare an acrylic pressure-sensitive adhesive solution (17).
(Manufacture of a Pressure-sensitive Adhesive Sheet)
A pressure-sensitive adhesive sheet was manufactured in the same method as Example 1, except for using the above-mentioned acrylic pressure-sensitive adhesive solution (17) in place of the above-mentioned acrylic pressure-sensitive adhesive solution (1).

Comparative Example 8

(Preparation of a Pressure-sensitive Adhesive Composition)
An acrylic pressure-sensitive adhesive solution (18) was prepared in the same method as Example 3, except that 0.4 weight parts of the above-mentioned antistatic agent solution (a) (20% by weight) was used in place of 0.1 weight parts of the above-mentioned aliphatic amine-based ionic liquid (IL-A1 in a liquid state at 25° C., manufactured by Koei Chemical Co., Ltd.).
(Manufacture of a Pressure-sensitive Adhesive Sheet)
A pressure-sensitive adhesive sheet was manufactured in the same method as Example 1, except for using the above-mentioned acrylic pressure-sensitive adhesive solution (18) in place of the above-mentioned acrylic pressure-sensitive adhesive solution (1).

Comparative Example 9

(Preparation of a Pressure-sensitive Adhesive Composition)
An acrylic pressure-sensitive adhesive solution (19) was prepared in the same method as Example 3, except that 1.0 weight part of the above-mentioned antistatic agent solution (a) (20% by weight) was used in place of 0.1 weight parts of the above-mentioned aliphatic amine-based ionic liquid (IL-A1 in a liquid state at 25° C., manufactured by Koei Chemical Co., Ltd.).
(Manufacture of a Pressure-sensitive Adhesive Sheet)
A pressure-sensitive adhesive sheet was manufactured in the same method as Example 1, except for using the above-mentioned acrylic pressure-sensitive adhesive solution (19) in place of the above-mentioned acrylic pressure-sensitive adhesive solution (1).

Comparative Example 10

(Preparation of a Pressure-sensitive Adhesive Composition)
An acrylic pressure-sensitive adhesive solution (20) was prepared in the same method as Example 1, except that 0.6 weight parts of the above-mentioned antistatic agent solution (a) (20% by weight) was used in place of 0.14 weight parts of the above-mentioned aliphatic amine-based ionic liquid (IL-A1 in a liquid state at 25° C., manufactured by Koei Chemical Co., Ltd.).
(Manufacture of a Pressure-sensitive Adhesive Sheet)
A pressure-sensitive adhesive sheet was manufactured in the same method as Example 1, except for using the above-mentioned acrylic pressure-sensitive adhesive solution (20) in place of the above-mentioned acrylic pressure-sensitive adhesive solution (1).
About pressure-sensitive adhesive sheets obtained in the above-mentioned Examples and Comparative examples, peeling electrification voltage, peeling electrification voltage with time, staining property, and adhesive strength were evaluated in the following manner.
<Measurement of Peeling Electrification Voltage>
A pressure-sensitive adhesive sheet was cut into a size of a width of 70 mm and a length of 130 mm, a separator was peeled, and this was adhered to a surface of a polarizing plate (SEG1425DU manufactured by Nitto Denko Corporation, width:70 mm, length:100 mm) laminated to an acryl plate (Acrylite manufactured by Mitsubishi Rayon Co., Ltd, thickness: 1 mm, width:70 mm, length:100 mm) from which electricity had been removed in advance, with a hand roller, so that one end was protruded by 30 mm.
After allowed to stand for one day under the environment of 23° C.×50% RH, and a sample was set at a prescribed position as shown in FIG. 1. One end protruding by 30 mm was fixed on an automatic winding machine, and a sample was peeled at a peeling angle of 150° and a peeling rate of 30 m/min. A voltage at a polarizing plate surface generated thereupon was measured with an electrostatic voltmeter (KSD-0103 manufactured by Kasuga Denki, INC.) fixed at a prescribed position. Measurement was performed under the environment of 20+ C.×25% RH.
<Measurement of Peeling Electrification Voltage with Time>
A pressure-sensitive adhesive sheet was cut into a size of a width of 70 mm and a length of 130 mm, a separator was peeled, and this was adhered to a surface of a polarizing plate (SEG1425DU manufactured by Nitto Denko Corporation, width:70 mm, length: 100 mm) laminated to an acryl plate (Acrylite manufactured by Mitsubishi Rayon Co., Ltd, thickness: 1 mm, width:70 mm, length:100 mm) from which electricity had been removed in advance, with a hand roller, so that one end was protruded by 30 mm.
After allowed to stand for 14 days under the environment of 40° C.×25% RH, and a sample was set at a prescribed position as shown in FIG. 1. One end protruding by 30 mm was fixed on an automatic winding machine, and a sample was peeled at a peeling angle of 150° and a peeling rate of 30 m/min. A voltage at a polarizing plate surface generated thereupon was measured with an electrostatic voltmeter (KSD-0103 manufactured by Kasuga Denka, INC.) fixed at a prescribed position. Measurement was performed under the environment of 20° C.×25% RH.

<Assessment of Staining Property>

After the above-mentioned peeling electrification voltage was measured, the peeled pressure-sensitive adhesive sheet was stuck again by hand so that air bubbles would be immixed between the sheet and the polarizing plate after the measurement. An assessment sample was thus prepared.

After this assessment sample was let alone in the environment of 23° C.×50% RH for one month, the pressure-sensitive adhesive sheet was peeled off from the adherend by hand. At that time, the staining state in the surface of the adherend was observed visually. The assessment criteria are as follows:

Case of observation of no staining: o
Case of observation of staining: x

<Measurement of Adhesive Strength>

A triacetylcellulose film (FujiTAC manufactured by Fuji Photo Film Co., Ltd., thickness: 90 µm) was cut into size of a width of 70 mm and a length of 100 mm, this was immersed in an aqueous sodium hydroxide solution (10% by weight) at 60° C. for 1 minute, and washed with distilled water to prepare an adherend.

The adherend was allowed to stand for 24 hours under the environment of 23° C.×50% RH, and a pressure-sensitive adhesive sheet which had been cut into a size of a width of 25 mm and a length of 100 mm was laminated on the adherend at a pressure of 0.25 MPa to prepare an assessment sample.

After allowing to stand for 30 minutes under the environment of 23° C.×50% RH after the lamination, an adhesive strength when peeled with a universal tensile testing machine at a peeling rate of 30 m/min and a peeling angle of 180° was measured. Measurement was performed under the environment of 23° C.×50% RH.

The results of the above are shown in Table 1.

TABLE 1

| | peeling electrification voltage [kV] | peeling electrification voltage with time [kV] | staining property [-] | adhesive strength [N/25 mm] |
|---|---|---|---|---|
| Example 1 | −0.1 | −0.1 | o | 2.8 |
| Example 2 | −0.1 | 0.0 | o | 3.0 |
| Example 3 | −0.2 | −0.3 | o | 2.7 |
| Example 4 | 0.0 | 0.0 | o | 2.1 |
| Example 5 | 0.0 | 0.0 | o | 2.5 |
| Example 6 | 0.0 | −0.2 | o | 2.1 |
| Example 7 | 0.0 | 0.0 | o | 2.3 |
| Example 8 | −0.3 | −0.3 | o | 1.6 |
| Example 9 | 0.0 | 0.0 | o | 2.2 |
| Example 10 | −0.1 | 0.0 | o | 1.3 |
| Comp. Ex. 1 | −0.3 | −0.7 | o | 2.8 |
| Comp. Ex. 2 | 1.3 | 1.6 | o | 2.6 |
| Comp. Ex. 3 | 0.0 | 0.0 | x | 0.5 |
| Comp. Ex. 4 | −0.3 | −0.6 | o | 2.5 |
| Comp. Ex. 5 | −0.9 | −1.4 | o | 2.5 |
| Comp. Ex. 6 | 1.3 | 1.5 | o | 2.6 |
| Comp. Ex. 7 | −0.4 | −1.2 | o | 2.5 |
| Comp. Ex. 8 | −1.0 | 0.0 | x | 0.8 |
| Comp. Ex. 9 | 0.0 | 0.0 | x | 0.4 |
| Comp. Ex. 10 | 0.0 | 0.0 | x | 0.5 |

From the results of the above-mentioned Table 1, when the pressure-sensitive adhesive compositions manufactured according to the present invention were used (Examples 1 to 10), it became clear that the peeling electrification voltage to the polarizing plate was controlled even with time and no staining was occurred on the polarizing plate in all Examples. On the other hand, when reactive surfactants different from those in the present invention were used (Comparative examples 1, 4, 5, and 7), in all cases, the peeling electrification voltage with time to the polarizing plate was higher compared to the results in Examples. Moreover, when pressure-sensitive adhesive compositions containing no ionic liquid were used (Comparative examples 2, and 6), in all cases, the peeling electrification voltage became high from the initial state. Further, when cationic surfactants were used as an antistatic agent (Comparative examples 3, 9, and 10), although the peeling electrification voltage to the polarizing plate was stably controlled even with time, the occurrence of staining was recognized. In addition, when the amount of a cationic surfactant added was reduced (Comparative example 8), the peeling electrification voltage in the initial stage was high and the occurrence of staining was also recognized. Therefore, in all Comparative examples, both of stably controlling the peeling electrification voltage with time to the polarizing plate that is an adherend and of controlling the occurrence of staining on the plate cannot be satisfied, it became clear that the pressure-sensitive adhesive compositions prepared in Comparative examples were not suitable for manufacturing an antistatic pressure-sensitive adhesive sheet.

Moreover, all of pressure-sensitive adhesive sheets in Examples 1 to 10 of the present invention have adhesive strength in peeling at 180° in the range of 0.1 to 6 N/25 mm and can be recognized to be applicable pressure-sensitive adhesive sheets as a pressure-sensitive adhesive sheet.

What is claimed is:

1. A pressure-sensitive adhesive composition comprising an ionic liquid, and a (meth)acryl-based polymer containing, as a monomer component, 0.01 to 20% by weight of a reactive surfactant shown by the following general formula (I) as a monomer unit:

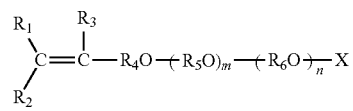

(I)

wherein $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 5 to 100 (may not be an integer), m+n indicates the number of 5 to 150 (may not be an integer), and X is hydrogen.

2. The pressure-sensitive adhesive composition according to claim 1, wherein the ionic liquid is at least one kind or more of a nitrogen-containing onium salt, a sulfur-containing onium salt, and a phosphorus-containing onium salt.

3. The pressure-sensitive adhesive composition according to claim 1, wherein the ionic liquid contains one or more kinds of cations represented by the following general formulas (A) to (D):

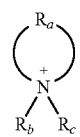

(A)

-continued (B) 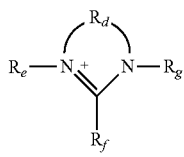

(C) 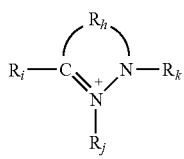

(D) 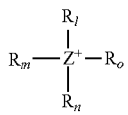

wherein, in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present, in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom, in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom, in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present.

4. The pressure-sensitive adhesive composition according to claim 1, wherein the pressure-sensitive adhesive composition contains an ether group-containing compound.

5. A pressure-sensitive adhesive layer, wherein the pressure-sensitive adhesive composition as defined in claim 1 is crosslinked.

6. A pressure-sensitive adhesive sheet comprising a pressure-sensitive adhesive layer containing a pressure-sensitive adhesive composition as defined in claim 1 on one side or both sides of a support.

7. A surface protecting film comprising a pressure-sensitive adhesive layer, which is formed by crosslinking a pressure-sensitive adhesive composition as defined in claim 1 on one side or both sides of a support which is provided with an antistatic-treated plastic film.

8. A pressure-sensitive adhesive composition comprising:
an ionic liquid; and
a (meth)acryl-based polymer which is a base polymer containing, as a monomer component, 0.01 to 20% by weight of a reactive surfactant of general formula (I), wherein an ether group in a backbone of the base polymer is coordinated with the ionic liquid:

(I) 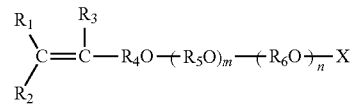

wherein $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 5 to 100 (may not be an integer), m+n indicates the number of 5 to 150 (may not be an integer), and X is hydrogen,
wherein the ionic liquid accounts for 0.01 to 40 parts by weight of the base polymer.

9. The pressure-sensitive adhesive composition according to claim 8, wherein the ionic liquid is a melt salt ionic compound exhibiting the liquid state at room temperature.

10. The pressure-sensitive adhesive composition according to claim 8, wherein in formula (I), $R_4$ is an alkylene group of 0 to 10 in carbon number.

11. The pressure-sensitive adhesive composition according to claim 8, wherein in formula (I), $R_6$ is an alkylene group of 1 to 4 in carbon number.

12. The pressure-sensitive adhesive composition according to claim 8, wherein (meth)acrylate constituting the base polymer has an acid functional group.

13. The pressure-sensitive adhesive composition according to claim 12, wherein the base polymer has an acid value of 29 or less.

14. The pressure-sensitive adhesive composition according to claim 8, wherein the base polymer has a weight average molecular weight of 100,000 to 5,000,000.

15. The pressure-sensitive adhesive composition according to claim 8, wherein the base polymer has a glass transition temperature (Tg) of not lower than −100° C.

16. A pressure-sensitive adhesive composition comprising
an ionic liquid;
an ether group-containing compound; and
a (meth)acryl-based polymer which is a base polymer containing, as a monomer component, 0.01 to 20% by weight of a reactive surfactant of general formula (I), wherein an ether group in a backbone of the base polymer is coordinated with the ionic liquid:

(I) 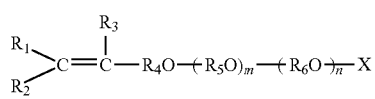

wherein $R_1$, $R_2$, and $R_3$ indicate likewise or differently hydrogen or the methyl group, $R_4$ indicates an alkylene group of 0 to 30 in carbon number (further, 0 in carbon number means that there is no $R_4$), $R_5$ and $R_6$ indicate likewise or differently alkylene groups of 1 to 30 in carbon number, m indicates the number of 0 to 50 (may not be an integer), n indicates the number of 5 to 100 (may not be an integer), m+n indicates the number of 5 to 150 (may not be an integer), and X is hydrogen.

17. The pressure-sensitive adhesive composition according to claim 1, wherein the pressure sensitive adhesive has an absolute value of peeling electrification of about 0.3 kV or less upon peeling the pressure sensitive adhesive layer from a polarizing plate after standing for 14 days at 40° C. and 25% relative humidity.

18. The pressure-sensitive adhesive composition according to claim 17, wherein upon peeling the pressure sensitive adhesive layer from a polarizing plate staining is prevented.

* * * * *